(12) United States Patent
Jesme et al.

(10) Patent No.: US 7,938,335 B2
(45) Date of Patent: *May 10, 2011

(54) RADIO FREQUENCY IDENTIFICATION FUNCTIONALITY COUPLED TO ELECTRICALLY CONDUCTIVE SIGNAGE

(75) Inventors: Ronald D. Jesme, Plymout, MN (US); Robert A. Sainati, Bloomington, MN (US); Swagata R. Banerjee, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 427 days.

This patent is subject to a terminal disclaimer.

(21) Appl. No.: 12/106,107

(22) Filed: Apr. 18, 2008

(65) Prior Publication Data

US 2008/0258875 A1 Oct. 23, 2008

Related U.S. Application Data

(60) Provisional application No. 60/925,103, filed on Apr. 18, 2007.

(51) Int. Cl.
*G06K 19/06* (2006.01)
(52) U.S. Cl. ....... 235/492; 235/375; 235/380; 340/5.61; 340/10.1; 340/572.7; 340/928
(58) Field of Classification Search .................. 235/492, 235/375, 380; 340/5.61, 10.1, 572.7, 928
See application file for complete search history.

(56) References Cited

U.S. PATENT DOCUMENTS

| | | | |
|---|---|---|---|
| 5,493,291 A * | 2/1996 | Bruggemann | 340/905 |
| 6,265,977 B1 | 7/2001 | Vega et al. | |
| 6,371,380 B1 | 4/2002 | Tanimura | |
| 6,999,028 B2 | 2/2006 | Egbert | |
| 7,055,754 B2 | 6/2006 | Forster | |
| 2005/0093678 A1 | 5/2005 | Forster et al. | |
| 2006/0261950 A1 | 11/2006 | Arneson et al. | |
| 2007/0008140 A1* | 1/2007 | Saarisalo et al. | 340/572.7 |
| 2007/0017986 A1 | 1/2007 | Carrender et al. | |

FOREIGN PATENT DOCUMENTS

| | | |
|---|---|---|
| DE | 29822146 | 3/1999 |
| KR | 10-2002-0075100 | 10/2002 |
| WO | WO 96/35196 | 11/1996 |
| WO | WO 03/030093 | 4/2003 |
| WO | WO 03/067512 | 8/2003 |

OTHER PUBLICATIONS

Arnold Magnetic Technologies Corporation, Soft Magnetics Application Guide: pp. 30-31, Rev. B, (Feb. 2003).
K. Finkenzeller, Reid Handbook, Radio-Frequency Identification Fundamentals and Applications, pp. 21, 64 (1999).
John C. Slater and Nathaniel H. Frank, Electromagnetism, pp. 78-80 (1969).
B.T. Stephenson and C.H. Walter, Endfire Slot Antennas, Ire Transactions—Antennas and Propagation, pp. 81-86, (1956).
L. Ukkonen, M. Schaffrath, L. Sydanheimo, M. Kivikoski, *Analysis of Integrated Slot-Type Tag Antennas for Passive UHF RFID*, IEEE, (Feb. 2006).

\* cited by examiner

*Primary Examiner* — Allyson N Trail
(74) *Attorney, Agent, or Firm* — Sandra K. Nowak

(57) ABSTRACT

The present disclosure relates to multiple embodiments of a signage having radio-frequency responsive features, methods of making and using the signage, and the performance characteristics of the signage. These embodiments include a cutout, aperture, or opening in an electrically conductive sign into which or adjacent to which is placed an RFID tag or chip.

30 Claims, 24 Drawing Sheets

450

RADIO FREQUENCY IDENTIFICATION FUNCTIONALITY COUPLED TO ELECTRICALLY CONDUCTIVE SIGNAGE

RELATED APPLICATION

This application claims the benefit under 35 U.S.C. §119(e) of U.S. Provisional Application No. 60/925,103 filed Apr. 18, 2007.

TECHNICAL FIELD

The present disclosure relates to multiple embodiments of a signage article having radio-frequency responsive features, methods of making and using the signage article, and the performance characteristics of the signage article.

BACKGROUND

Radio frequency identification technology, sometimes referred to as RFID technology, has a variety of commercial applications, and is typically used for object identification and tracking.

This section describes at least one embodiment of a typical radio frequency identification ("RFID") tag and reader, this embodiment and others are well known in the art. FIG. 1 illustrates a typical radio frequency identification ("RFID") tag 10. The RFID tag 10 includes a substrate 12 having a first major surface 14 and a second major surface 16 opposite the first major surface 14. The substrate 12 may optionally be a flexible substrate, such that it could be used in a label that may be wrapped around an object. The flexible substrate 12 could have enough flexibility to conform to a variety of surfaces and bend easily around objects. For example, the substrate 12 may be in the range of 25-100 microns in thickness, and may be made of a flexible material, such as polyester, polyethylene naphthanate, polyimide, polypropylene, paper, or other flexible materials apparent to those skilled in the art.

An RFID element is attached to the first major surface 14 of the substrate 12. The RFID element has information storage and transmission capabilities adapted to enable an interrogation system to obtain information from the radio frequency-responsive element. The RFID element typically includes two major components: an integrated circuit 20 and an antenna 18. The integrated circuit 20 provides the primary identification function. It includes circuitry to permanently store the tag identification and other desirable information, interpret and process commands received from the interrogation hardware, respond to requests for information by the interrogator, and assist the hardware in resolving conflicts resulting from multiple tags responding to interrogation simultaneously. Optionally, the integrated circuit may provide for updating the information stored in its memory (read/write) as opposed to just reading the information out (read only). Some exemplary integrated circuits suitable for use in RFID tags 10 include those commercially available from Texas Instruments™ (in their line of products under the trade names TI-RFid™ or TAG-IT™), Philips and/or NXP Electronics Co. (in their line of products under the trade names I-CODE™, MIFARE™, and HITAG™), among others.

The antenna 18 geometry and properties depend on the desired operating frequency of the RFID tag 20. For example, 915 MHz or 2.45 GHz RFID tags 10 would typically include a dipole antenna, such as a linear dipole antenna or a folded dipole antenna (not shown). A 13.56 MHz (or similar) RFID tag 10 would typically use a spiral or coil antenna 18, as shown in FIG. 1. However, other antenna designs are known to those skilled in the art. The antenna 18 intercepts the radio frequency energy radiated by an interrogation source, such as a RFID reader 60 illustrated schematically in FIG. 2. (Reference number 62 illustrates the radio frequency energy radiated by the RFID reader 60.) Radio frequency energy 62 carries both power and commands to the tag 10. The antenna enables the RF-responsive element to absorb energy sufficient to power the integrated circuit 20 and thereby provide the response to be detected. Thus, the characteristics of the antenna are typically matched to the system in which it is incorporated. In the case of tags operating in the high MHz to GHz range, one of the most important characteristics is typically the antenna size. Often, the effective length of a dipole antenna is selected so that it is close to a half wavelength or multiple half wavelength of the interrogation signal. In the case of tags operating in the low to mid MHz region (13.56 MHz, for example) where a half wavelength antenna is impractical due to size limitations, the important characteristics are typically antenna inductance and the number of turns on the antenna coil. Often, metals such as copper or aluminum are used, but other conductors, including printed inks, are also acceptable. It is also important that the input impedance of the selected integrated circuit match the impedance of the antenna for maximum energy transfer. Additional information about antennas is known to those of ordinary skill in the art, for example, in reference texts such as *RFID Handbook, Radio-Frequency Identification Fundamentals and Applications*, by K. Finkenzeller, (1999 John Wiley & Sons Ltd, Chichester, West Sussex, England).

A capacitor 22 is often included to increase the performance of the RFID tag 10. The capacitor 22, when present, aids in tuning the operating frequency of the tag to a particular value. This is desirable for obtaining maximum operating range. The capacitor may either be a discrete component or may be integrated into the antenna 18.

An RFID reader or interrogator 60 is schematically illustrated in FIG. 2. The RFID reader 60 includes an RFID reader antenna 64. RFID readers 60 are well known in the art. For example, commercially available RFID readers are available from 3M Company based in St. Paul sold under the trade name 3M™ Digital Library Assistant™ as model numbers 702, 703, 802, and 803. Another example of a commercially available RFID reader is a model IP4 portable RFID (UHF) Reader attached to an Intermec™ 700 Series Mobile computer available from Intermec Technologies Corporation, Everett, Wash.

The RFID reader 60 and RFID tag 10 form an RFID system. Inductively coupled RFID systems are based on near-field magnetic coupling between the antenna loop of the RFID reader and the antenna coil of the RFID transponder, according to *RFID Handbook, Radio-Frequency Identification Fundamentals and Applications*, by K. Finkenzeller, (1999 John Wiley & Sons Ltd, Chichester, West Sussex, England) pp. 21. A number of RFID systems are available, following one of several communication and system performance standards. The discussion below is principally based on RFID systems operating at 13.56 MHz, but the discussion extends to inductively coupled RFID systems at other operating frequencies and provides insights into the interference that conductive objects can pose to electromagnetically coupled RFID systems.

Radio frequency-responsive tags can be either active or passive. An active tag incorporates an additional energy source, such as a battery, into the tag construction. This energy source permits active radio frequency-responsive tags to create and transmit strong response signals even in regions where the interrogating radio frequency field is weak, and thus an active radio frequency-responsive tag can be detected at greater range. However, the relatively short lifetime of the battery limits the useful life of the tag. In addition, the battery adds to the size and cost of the tag. A passive tag derives the energy needed to power the tag from the interrogating radio frequency field, and uses that energy to transmit response codes by modulating the impedance the antenna presents to the interrogating field, thereby modulating the signal reflected back to the reader antenna. Thus, their range is more limited. Because passive tags are preferred for many applications, the remainder of the discussion will be confined to this class of tag. Those skilled in the art, however, will recognize that these two types of tags share many features and that both can be used in the examples of this disclosure.

SUMMARY

The inventors of the present application recognized that by coupling RFID functionality to a signage, such as, for example, a metal sign, the signage can be associated with data stored in the RFID tag or chip that is affixed to or integrated with the metal sign. The prior art attempts to attach or couple an RFID tag to a metal sign have certain drawbacks. However, the inventors of the present application discovered various ways to successfully attach or couple RFID functionality to an electrically conductive signage.

One method of attaching or coupling RFID functionality to a signage involves physically coupling a functioning RFID tag and an electrically conductive signage. The resulting signage includes a functioning RFID tag that is inset into the signage.

An alternative method of attaching or coupling RFID functionality to a signage involves forming a slot, opening, or aperture in the signage and using that slot, opening, or aperture to act as an antenna for an RFID chip that is physically coupled to the signage.

One exemplary embodiment of an electrically conductive RFID-enabled signage includes an electrically conductive element including a cutout and an RFID tag inset into the cutout. The electrically conductive element includes at least one of an electrically conductive substrate or an electrically conductive sheeting. For example, the electrically conductive element may be a metal substrate positioned adjacent to nonconductive or conductive optically active sheeting, such as, for example, retroreflective or reflective sheeting. Alternatively, the electrically conductive element may be a nonconductive substrate positioned adjacent to conductive optically active sheeting, such as, for example, retroreflective or reflective sheeting. Thus the electrical conductivity of the signage article may be derived from the use of an electrically conductive signage substrate or from the use of an electrically conductive sheeting positioned adjacent to the signage substrate.

An exemplary method of forming an electrically conductive, RFID-enabled signage article involves selecting a location on an electrically conductive element; forming a cutout in the electrically conductive element at the selected location; and placing a radio frequency identification (RFID) tag into the cutout. The location selection step is based on consideration of a desired radiation pattern of the electrically conductive, RFID-enabled signage article that is formed when the RFID tag is placed into the cutout.

Another exemplary method involves forming a cutout having a cutout size and a cutout shape in an electrically conductive element having a conductive portion size and a conductive portion shape and placing a radio frequency identification (RFID) tag into the cutout to form an electrically conductive, RFID-enabled signage article. In some embodiments, the selection of the cutout size may be based on a desired radiation pattern. In some embodiments, the selection of the cutout shape may be based on a desired radiation pattern. In some embodiments, the selection of the conductive portion size may be based on a desired radiation pattern. In some embodiments, the selection of the conductive portion shape may be based on a desired radiation pattern.

Another exemplary embodiment of an electrically conductive, radio frequency identification (RFID)-enabled signage article includes a slot antenna including an electrically conductive element having an opening; and an RFID integrated circuit coupled to the substrate. The slot antenna operates as an RFID antenna, and the electrically conductive element includes at least one of an electrically conductive substrate or an electrically conductive sheeting.

One method of forming an electrically conductive, radio frequency identification (RFID)-enabled signage article involves selecting an electrically conductive element having a length and a width; forming an opening in the electrically conductive element; and coupling a radio frequency identification (RFID) integrated circuit to at least a portion of the electrically conductive element. The step relating to selecting an electrically conductive element having a length and a width may be based on a desired radiation direction and/or pattern of a electrically conductive, RFID-enabled signage article that is formed when the RFID integrated circuit is coupled with the electrically conductive element.

Another method involves selecting a location on an electrically conductive element; forming an opening in at least a portion of the electrically conductive element at the selected location; and coupling a radio frequency identification (RFID) integrated circuit to at least a portion of the electrically conductive element. The selecting a location on the electrically conductive element step may be based on a desired radiation direction and/or pattern of the electrically conductive, RFID-enabled signage article that is formed when the RFID integrated circuit is coupled with the electrically conductive element.

DETAILED DESCRIPTION

As used herein, the term "RFID label" is used interchangeably with the term "RFID tag." In addition, the term "RFID element" may refer to a RFID label or tag as well as to any component that makes up an RFID label or tag (e.g., an RFID integrated circuit, antenna or electrical interconnect network).

The inventors of the present patent application recognized that it would be beneficial to attach an RFID label to a signage in order to, for example, facilitate identification and tracking of the signage and to improve maintenance and replacement services. The RFID labels may contain information stored on the integrated chip related to the part it is attached to, for example, signage type, date of manufacture, manufacturer codes, date of installation and maintenance, signage location and position, signage material, signage construction information, reflectance or other performance measurements, date of last inspection, and inspection information. This information can be particularly useful in the maintenance of the signage because the inspection history of the signage can be stored on the RFID label as it goes through different stages of its life cycle. Additionally, this information can be useful to electronically provide information to roadway vehicles, one example being as an automatic navigational aid.

However, many types of signage, including metal or otherwise electrically conductive signage, and typical RFID elements generally do not work properly when operated within about a quarter inch (0.64 cm), or 6 mm (15.24 cm), of one another. In short, when the RFID tags or labels are in close proximity to a conductive object, such as a metal road sign, there tends to be interference problems resulting in the RFID reader being unable to successfully read the RFID tag.

Figure 1:
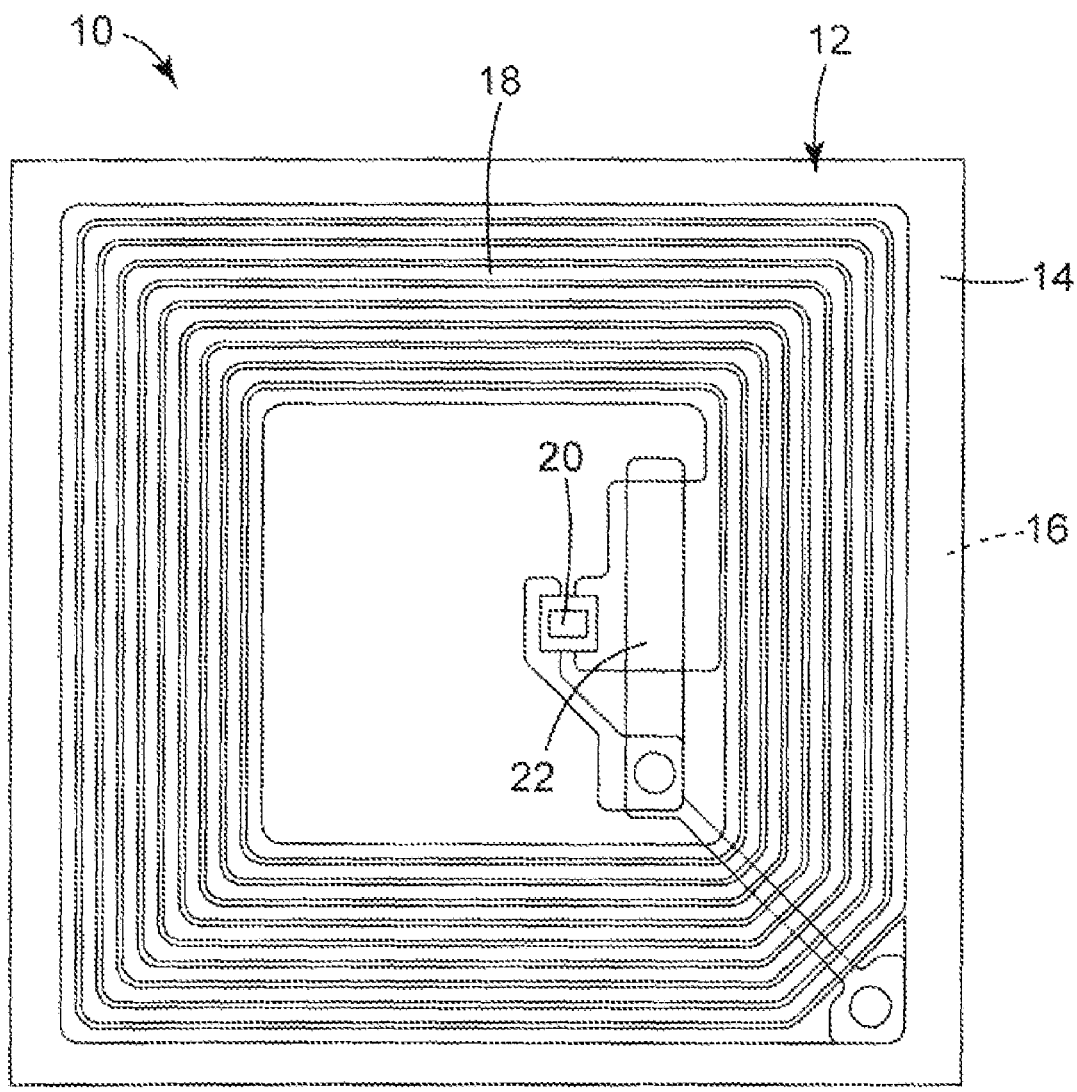
FIG. 1 is a top view of a radio frequency identifications ("RFID") tag known in the art.
Figure 2:
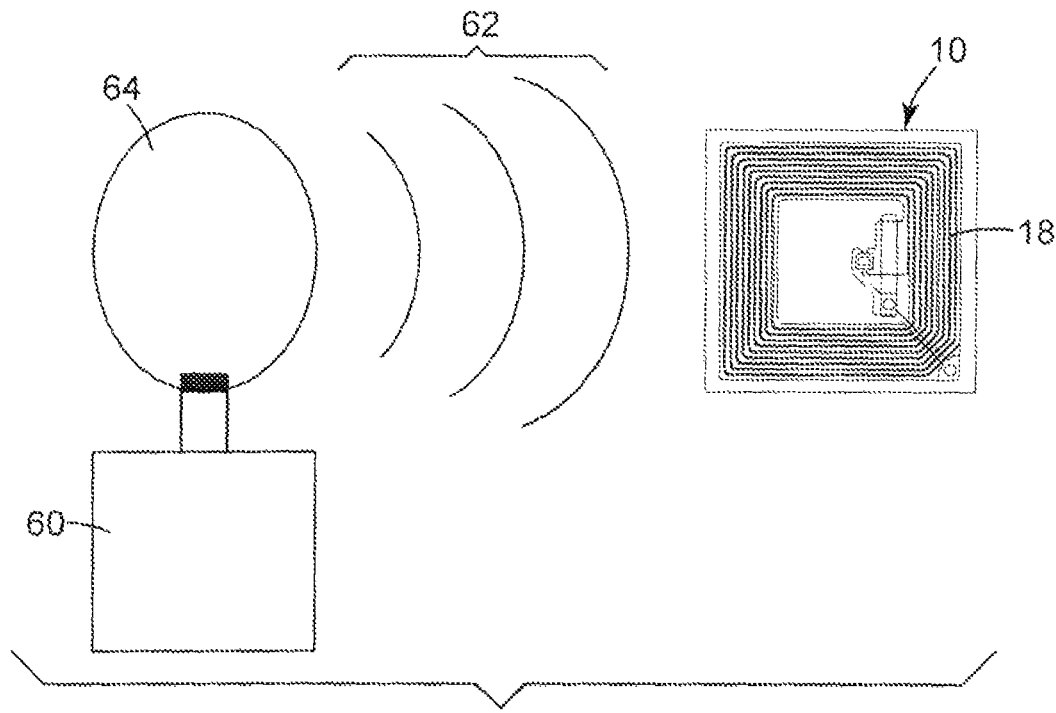
FIG. 2 is a schematic view of interactions between the RFID tag of FIG. 1 and a RFID reader.
Figure 3:
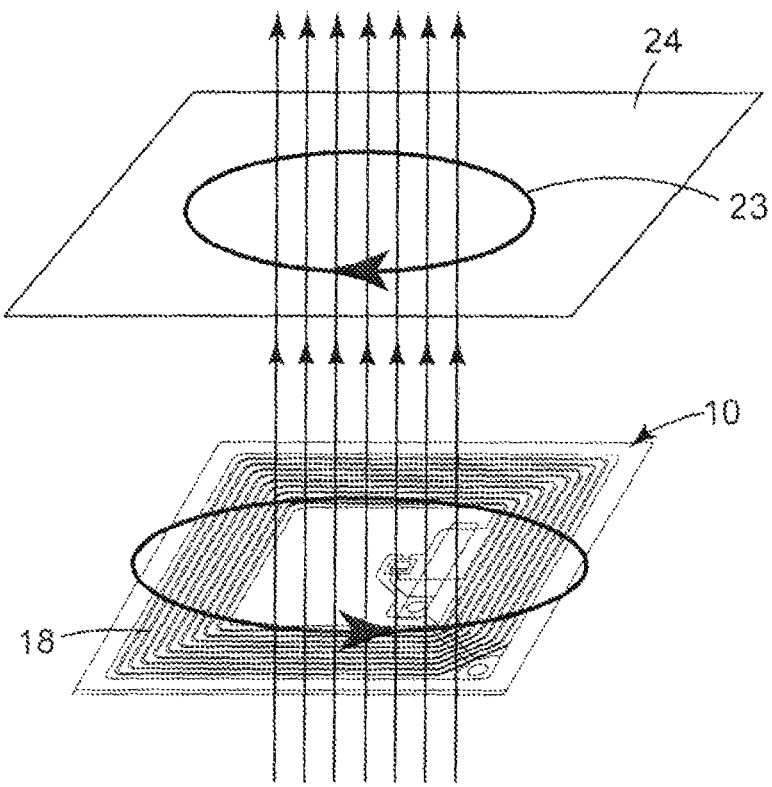
FIG. 3 illustrates the interaction between the RFID tag of FIG. 1 and a conductive object.
Figure 4:
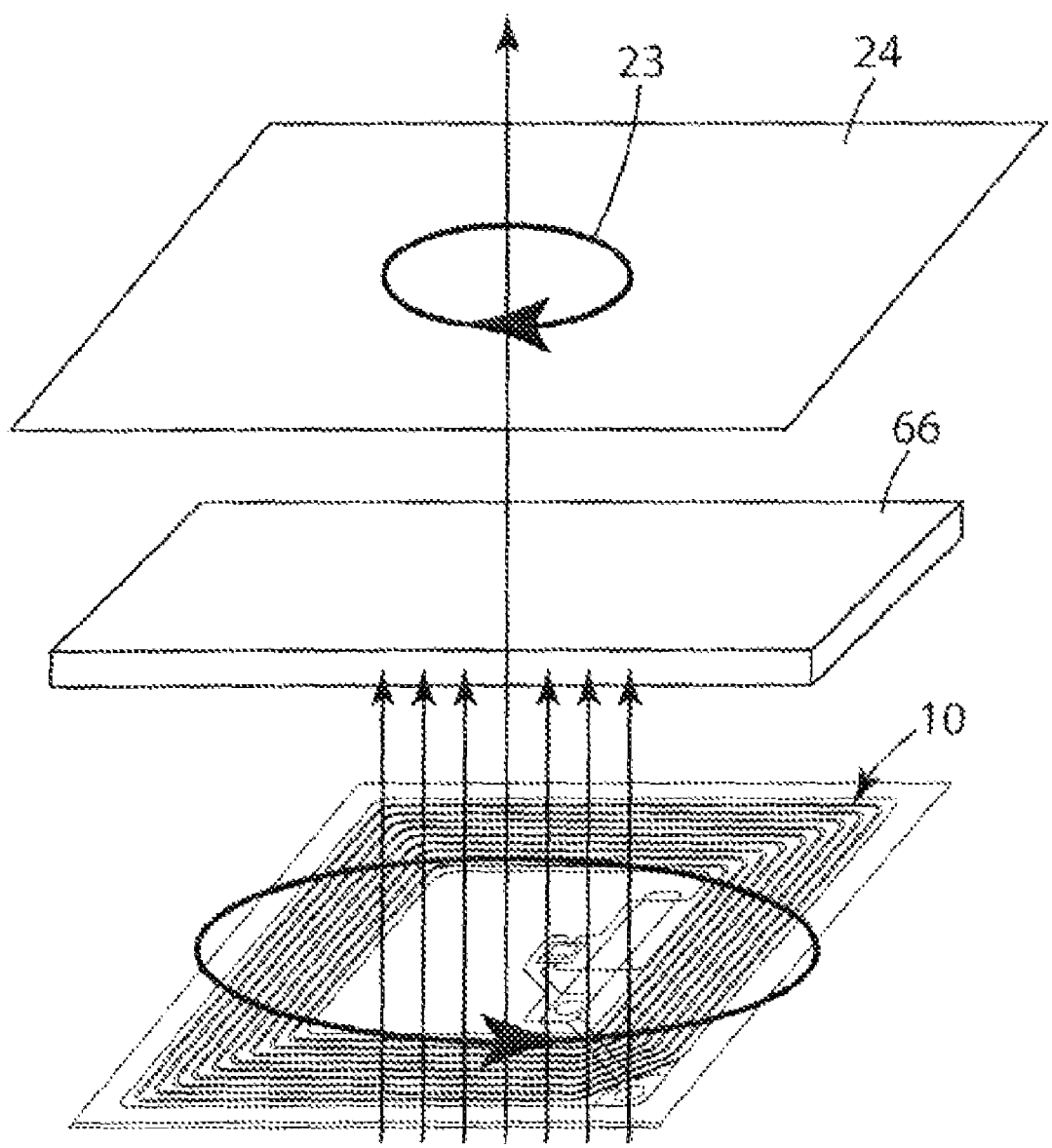
FIG. 4 illustrates the interaction between the RFID tag and conductive object of FIG. 3 and a spacer.

This section describes the typical interactions between RFID tags and RFID readers, and the interference problems typically encountered when RFID tags are in close proximity to electrically conductive objects. FIG. 2 illustrates the RFID reader 60 interrogating an RFID tag 10 that is not located close to an electrically conductive object. FIG. 3 illustrates the interrogation of an RFID tag 10 in close proximity to an electrically conductive object 24. Examples of electrically conductive objects 24 include objects containing metal, non-metallic substances (e.g., carbon-fiber based composite), or liquid (e.g., an aqueous ionic solution in a bottle). For example, an electrically conductive object could include a metal car part or tool. FIG. 4 illustrates the interrogation of the RFID tag 10 in close proximity to the electrically conductive object 24 with a prior art spacer layer 66 located between the RFID tag 10 and the electrically conductive object 24.

As illustrated in FIG. 2, when the RFID reader 60 is attempting to interrogate the RFID tag 10, the RFID reader 60 produces a time-varying electrical current in the RFID reader antenna 64. The variations in electrical current may be a smoothly varying sinusoidal carrier frequency, or the variations may be aperiodic and non-repetitive variations in amplitude, frequency, or phase of the sinusoidal carrier frequency representing encoded digital data. The time-varying electrical current produces an electromagnetic field, which extends through space to the RFID antenna 18. The time-varying magnetic flux through the RFID antenna 18 induces an electromotive force (EMF) in the RFID antenna 18, according to Faraday's Law of Induction, which is described in more detail in *Electromagnetism* by John C. Slater and Nathaniel H. Frank, (1969 Dover Publications, New York), pp. 78-80. The induced EMF appears as an effective induced voltage across the two end terminals of the RFID antenna 18, hence giving the classification known in the art as an "inductively coupled RFID system." The induced voltage drives a time-varying electrical current through the RFID integrated circuit 20, thereby completing the RFID communication link from the RFID reader 60 to the RFID tag 10.

When, as illustrated in FIG. 3, the RFID antenna 18 is not in free space, but is adjacent to an item with finite electrical conductivity, such as an electrically conductive object 24, the EMF induced in the RFID transponder antenna is reduced, generally to a level at which the tag is not able to respond. This occurs when situations such as that illustrated by FIG. 3 occur, i.e., when the plane of the RFID antenna 18 is substantially parallel with and proximate to the surface of the electrically conductive object 24. This might be the case if, for example, the RFID tag 10 is attached to the electrically conductive object 24 as a label to identify the object. According to Faraday's Law of Induction, eddy currents 23 will be induced in the conductive object, as is discussed in more detail in *Electromagnetism* by John C. Slater and Nathaniel H. Frank, (1969 Dover Publications, New York) pp. 78-80. According to Lenz's Law, the net effect of the eddy currents 23 is reduction of the magnetic flux near the conductive object, as is discussed in more detail in the *RFID Handbook, Radio-Frequency Identification Fundamentals and Applications*, by K. Finkenzeller, (1999 John Wiley & Sons Ltd, Chichester, West Sussex, England) p. 64. The reduced net magnetic flux near the electrically conductive object results in a reduced EMF in the RFID transponder antenna, compared to the first case illustrated in FIG. 2, where the RFID antenna 18 was in free space.

If the antenna 18 of the RFID tag 10 is a rectilinear antenna, as illustrated in FIG. 4, then the conductors that comprise the antenna 18 are essentially long straight conductors, connected at each end to adjacent conductors to form a loosely coiled antenna form. The electrical current I in each long straight portion of each conductor in the RFID antenna 18 sets up a magnetic field H at a distance r away from each portion respectively, according to the following formula:

$$H = I/(2\pi r)$$

If the RFID tag 10 is proximate or adjacent to the electrically conductive object 24, the magnetic fields generated by each conductor segment will induce a counter-circulating eddy current 23 in the electrically conductive object 24, as illustrated by the clockwise arrow. The strength of the induced eddy current 23 depends on the amount of magnetic field energy coupled into the conductive substrate. If the RFID tag 10 is attached to the electrically conductive object 10, for example by a thin layer of adhesive, the energy coupled from the RFID tag 10 to the electrically conductive object 24 will be large and the induced eddy current 23 will be correspondingly large. If the eddy current 23 is similar in magnitude to the RFID tag 10 current, but opposite in direction, the sum of the transponder current and the eddy current will be essentially zero and the RFID tag 10 will not be detected by the RFID reader 60. This physical phenomenon is often referred to by those skilled in the art as "interference problems" when RFID tags are in close proximity with electrically conductive objects such as metal objects.

Various attempts have been made to reduce or eliminate the interference problems described above when an RFID tag is proximate or adjacent to an electrically conductive object. Using some of these methods, as is discussed in greater detail below, it is possible for an RFID reader to properly read the RFID tag, despite its location next to the electrically conductive object. Various methods described in the prior art literature may be used to electromagnetically decouple the RFID transponder from the electrically conductive surface. Examples of such methods are disclosed in the following publications and patent: PCT Publication WO 03/030093 (Gschwindt), "Transponder Label and Method for the Production Thereof," PCT Publication WO 03/067512 (Surkau), "Transponder Label"; and U.S. Pat. No. 6,371,380 (Tanimura), "Non-Contacting-Type Information Storing Device. WO 03/030093 describes a shielding layer that has ferrite particles embedded therein. WO 03/067512 also describes a shielding film that has ferrite particles embedded therein. Ferrite particles are inorganic compounds containing iron in one of its natural oxidation states ($Fe^{3+}$) chemically bound with oxygen and other chemical elements. Typically, the ferrite particles are uniform in composition throughout the particle, and homogenous, for example, the ferrite compound is the same throughout the full depth of the particle. U.S. Pat. No. 6,371,380 describes using a magnetism absorbing plate formed from Sendust. Although not stated in the '380 patent, it is known in the industry that Sendust is made from a ferrous alloy powder. The base material is approximately 85% iron, 6% aluminum, and 9% silicon. (See, for example, *Soft Magnetics Application Guide* published by Arnold Magnetic Technologies Corporation, Rochester, N.Y., p. 30-1, February 2003 Rev. B.).

Another solution taught in the prior art to help reduce the interference problems is to insert a nonconductive, nonmagnetic dielectric physical spacer, for example, polymer film, foam tape, or similar materials between the conductive object 24 and the RFID tag 10. The physical spacer increases the distance between the conductors comprising the RFID antenna 18 and the substrate of the electrically conductive object 24. According to the equation referenced below, $$H=I/(2\pi r),$$

when the distance r between the RFID antenna 18 and the substrate of the electrically conductive object 24 is increased, the magnetic field intensity H is commensurately reduced at the surface of the electrically conductive object. In this condition, the magnetic field energy coupled to the electrically conductive object is reduced, compared to the case where the RFID tag is directly adjacent the electrically conductive object 24. However, again, the disadvantage of this approach is the additional thickness that is required by the polymer film, foam tape or other similar materials to put adequate distance between the RFID tag and the electrically conductive object to help reduce or eliminate the interference problems. The examples illustrate the typical thicknesses of nonconductive, nonmagnetic, dielectric physical spacers, such as foam core, paper, or polymer films, which are required to successful read an RFID tag adjacent an electrically conductive surface with an RFID reader.

Each of these methods have certain disadvantages. The present inventors recognized a need to provide various alternative methods of reducing or eliminating interference problems when an RFID tag or chip is attached to an electrically conductive signage. The present inventors also recognized the benefit of associating RFID functionality with a signage, including an electrically conductive signage, such as a metal signage. Some preferred solutions have a relatively low areal mass density and therefore have relatively minimal impact to the mass of the overall signage. In addition, because multiple signages may be stacked in a pile before and during installation, the present inventors also recognized that some preferred embodiments might comprise an RFID-enabled signage capable of being stacked with other RFID-enabled signages without damaging the RFID elements in any of the RFID-enabled signages. In some embodiments, the RFID elements are placed within the signage thickness or are flush with a major signage surface. Additionally or alternatively, the present inventors also recognized that some preferred embodiments may include RFID elements that are permanently attached or affixed to the signage and some preferred embodiments may include RFID elements that are removably attached or affixed to the signage.

The present inventors invented multiple constructions, methods of making and using, and embodiments of an electrically conductive signage having RFID functionality. One exemplary construction and/or embodiment involves attaching or coupling RFID functionality to a signage by physically inseting a functioning RFID tag into an electrically conductive signage. An alternative exemplary construction and/or embodiment involves attaching or coupling RFID functionality to a signage by forming a slot, opening, or aperture in the signage and using that slot, opening, or aperture to act as an antenna for an RFID chip that is physically coupled to the signage. The resulting signage includes an RFID integrated circuit that is attached to the signage such that the slot creates an antenna for the RFID integrated circuit. These constructions, embodiments, and methods are discussed in greater detail below.

Exemplary signage articles include, but are not limited to, traffic control materials; retroreflective, non-retroreflective, reflective, and non-reflective vehicle or roadway markings; retroreflective garments; indoor/outdoor labeling products; frangible security stickers; product authentication materials; store display packages; documents; inventory labeling and control products; identification tags, labels, or systems; and license plates.

Figure 6A:
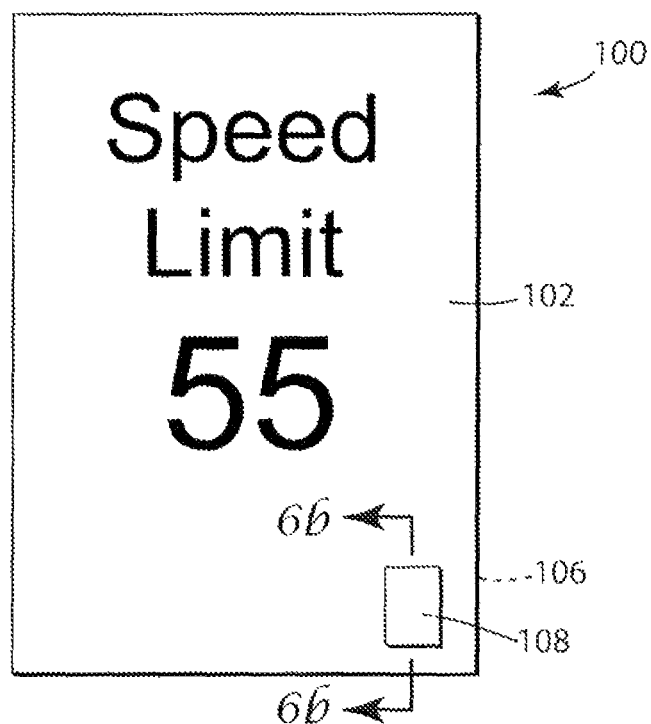
FIG. 6*a* is a schematic view of another embodiment of a traffic signage including an RFID tag.
Figure 6B:
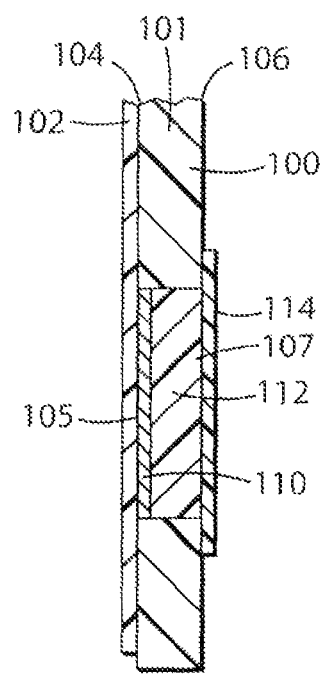
FIG. 6*b* is an exploded side view of the RFID tag area of FIG. 6*a*.

I. Signage Constructions Including a Functioning RFID Tag and an Electrically Conductive Substrate One exemplary embodiment of the present application is shown in FIGS. 6a and 6b. FIG. 6a shows a schematic view of an electrically conductive, RFID-enabled signage article 100. Signage article 100 includes a signage substrate 101 into which has been formed a cutout, opening, or aperture 108. Cutout 108 is shown as a rectangular cutout in FIGS. 6a and 6b, but can be any shaped cutout. FIG. 6b is an exploded, side view of signage article 100. FIG. 6*b* shows a first major surface 104 and a second major surface 106 of signage substrate 101. A layer of optically active sheeting 102 (including, but not limited to, retroreflective or reflective sheeting) is positioned adjacent to at least a portion of first major surface 104 of sign substrate 101. Sheeting 102 may be directly in contact with signage substrate 101. Sheeting 102 may alternatively be adjacent to signage substrate 101, such as, for example, when a layer of adhesive holds sheeting 102 adjacent to sign substrate 101.

In FIGS. 6*a* and 6*b*, the combination of the substrate and the sheeting form an electrically conductive element. As described in greater detail below, many options for an electrically conductive element exist. An electrically conductive element may include substrate 101 and sheeting 102 or may include only one of substrate 101 or sheeting 102. Further, substrate 101 may be electrically conductive or electrically nonconductive and sheeting 102 may be electrically conductive or electrically nonconductive. For example, substrate 101 may be electrically conductive and sheeting 102 may be electrically nonconductive; substrate 101 may be electrically nonconductive and sheeting 102 may be electrically conductive, or both substrate 101 and sheeting 102 may be electrically conductive. Further, cutout 108 may be formed in either or both of substrate 101 and sheeting 102. For example, cutout 108 may be formed in both substrate 101 and sheeting 102; in only substrate 101; or in only sheeting 102. Cutout 108, however, may preferably be formed in at least the electrically conductive portions of an electrically conductive element.

A fully functioning RFID tag 110 (e.g., an integrated circuit, antenna, and any electrical interconnect network) is inset into cutout 108. In FIG. 6*b*, RFID tag 110 is positioned in cutout such that a first major surface 105 of RFID tag 110 is adjacent to sheeting 102. A plug 112 is positioned within cutout 108 such that it is adjacent to a second major surface 107 of RFID tag 110. A layer of tape 114 holds plug 112 and RFID tag 110 within cutout 108.

In the embodiment shown in FIGS. 6*a* and 6*b*, RFID tag 110 (including its antenna) is relatively flush with signage substrate 101 and tape 114 preferably is of minimal thickness (for example, a thickness between about 0.5 mil to about 5 mil) such that no part of RFID tag 110 significantly protrudes from the surfaces 104, 106 of signage article 100 to an extent that would prohibit multiple signs from being stacked upon one another.

Signage substrate 101 may be formed of an electrically conductive material or of a nonconductive material. Exemplary electrically conductive materials include, for example, a metal plate, such as, for example, an aluminum plate. Exemplary nonconductive materials include, for example, wood or plastic. Where signage substrate 101 comprises a nonconductive material, electrical conductivity of the complete electrically conductive, RFID-enabled signage article may come from, for example, an electrically conductive sheeting placed on at least a portion of the signage article, such as, for example, metallized retroreflective sheeting. For purposes of this application, sheeting with a metal (e.g., aluminum) vapor coat is considered conductive, although the level of conductivity may be minimal. Exemplary metallized sheetings include, for example, the following commercially available products the 3290T series of sheeting products; the CW80 series of sheeting products; high intensity beaded sheeting, such as, for example, the 3870 series of sheeting products; flexible high intensity sheeting, such as, for example, the 3810 series, the 3840, and the 31x barricade sheeting products; and license plate or validation sheeting, all of which are manufactured by 3M Company located in St. Paul, Minn. Additionally, any prismatic sheeting products including a vapor coat would be considered conductive sheeting, such as, for example, the 985 conspicuity sheeting manufactured by 3M Company. Exemplary nonconductive sheeting products include, but are not limited to, prismatic sheeting products that are not vapor coated such as, for example, the HIP™ 3930 series, DG³™ 4000 series, VIP™ 3900 series, conspicuity 983 series, 3910 series CWZ™ prismatic, and rollup signs RS20 and RS30 series, all manufactured by 3M Company.

Those of skill in the art will appreciate that many changes can be made to the implementation shown in FIGS. 6*a* and 6*b* without departing from the spirit of the concept. For example, although RFID tag 110 is shown positioned adjacent to sheeting 102, plug 112 can be adjacent to sheeting 102 and RFID tag 110 can be adjacent to tape 114. Alternatively, signage article 100 can include two plugs, one of which is adjacent to sheeting 102 and one of which is adjacent to tape 114 and each of which are adjacent to a different major surface of RFID tag 110. Placement of the RFID tag 110 in relation to the thickness of signage substrate 101 may affect the tag performance, as will be discussed in greater detail below.

Plug 112 can be formed of any suitable material, including, but not limited to, any non-interfering, non-conductive material such as, for example, plastic. Also, the cutout 108 formed in signage article 100 need not be rectangular in shape; the cutout, opening, or aperture can be of any desirable shape or size and can be placed in any desirable location on signage article 100. It will be noted that the shape and size of the cutout may affect the performance of RFID tag 110 and may increase or decrease the amount of interference RFID tag 110 experiences. Further, signage article 100 need not be a rectangular speed limit sign, but can be any shape or form of signage. The tape 114 that is used in this implementation may not only hold plug 112 and RFID tag 110 in the cutout, but may also provide a weather-resistant seal that protects RFID tag 110. Tape 114 may also have a barcode printed on it. A suitable tape 114 may be chosen to fulfill all of these interests. Also, plug 112 could be designed such that tape 114 is not required, thereby creating a completely flush design.

In another exemplary embodiment, a single signage article may include more than one RFID tag. For example, using the technique described in Example 2, a first RFID tag could be placed such that it radiates most strongly toward the front of the signage article, and a second RFID tag could be placed such that it radiates most strongly toward the rear of the signage article. Further, the inclusion of a cutout in the signage article facilitates the formation of a signage article that can read very well at an off-angle as well as from the front and rear of the signage article.

Also, it will be appreciated that the above embodiments and implementations may include a surface acoustic wave (SAW) RFID tag rather than a traditional RFID tag.

In at least some embodiments, metal in the electrically conductive sign (e.g., use of a metal signage substrate or use of metalized sheeting) facilitates the readability of the RFID tag. Thus the electrically conductive sheeting and/or signage substrate assists in the performance of the RFID tag rather than hindering its performance. Consequently, the read-range performance (at least over some range of angles) is enhanced in at least some embodiments. In addition to higher directivity, another performance characteristic is the ability to at least partially restrict the range of angles over which the tag can be read.

When additional control of the radiation pattern is desired (i.e., control of nulls and/or beam lobes), it can be useful to include additional slots in the conductive sheeting to act as additional beam forming elements. These slots could be used as passive antenna elements to create a beam forming array, such as in a yagi or other multi-element antenna array design. For example, the elements can be arranged in an array of elements to increase the antenna directivity and possibly control the angle of maximum radiation. An array of elements includes, for example, multiple slots or insets that are electrically coordinated by spacing and/or phasing to produce a desired radiation pattern.

One advantage of the use of the RFID antennas described above is the ability to generate performance characteristics that are difficult to obtain from traditional RFID tag antennas on metal objects. One exemplary performance characteristic is high directivity, which translates into longer read ranges.

The following examples describe some exemplary constructions of various embodiments of the signage articles described in the present application. The following examples also report some of the performance results of the signage article constructions.

EXAMPLE 1

A signage article was made using a plastic substrate onto which was adhered or affixed non-metallized prismatic reflective sheeting. RFID tags (915 MHz) manufactured by Transcore Co. were affixed to one side of each of a variety of plastic substrates having thicknesses ranging from 1/10 inch (2.54 mm) to ½ inch (12.7 mm). Retroreflective Diamond Grade™ nonmetallic sheeting manufactured by 3M Company of St. Paul, Minn. was applied to the other side of each of the plastic substrates. The RFID tag on each of the plastic substrates was successfully read with an Intermec handheld reader at a distance of approximately 30 feet.

EXAMPLE 2

A cutout roughly 0.5 inch (12.7 mm) greater in dimension on all sides than a 2 inch (5.08 cm) by 3 inch (7.62 cm) 915 MHz passive Transcore RFID tag was cut into a 0.08 inch (2.03 mm) thick, 18 inch (45.7 cm) by 24 inch (61 cm) aluminum sign substrate. One of the major surfaces of the sign substrate was covered with retroreflective Diamond Grade™ sheeting manufactured by 3M Company of St. Paul, Minn. The RFID tag was placed into the cutout. A plastic plug having a thickness and shape that approximately matched the thickness and shape of the removed sign substrate was placed into the cutout such that the plastic plug was positioned adjacent to the RFID tag. Thus the plastic plug was substantially similar in size and shape to a size and shape of the cutout. A piece of non-metallic tape was placed on the backside of the sign substrate such that it completely covered the cutout and was positioned adjacent to the plastic plug. The RFID tag was successfully read with an Intermec handheld reader at a distance of approximately 30 feet, a distance comparable to the nonconductive RFID signage articles as described in Example 1.

Additionally, the inventors of the present application determined that by carefully controlling or selecting the location of the cutout, opening, or aperture and/or the RFID tag within the cutout, opening, or aperture on the signage, one can control or tailor the radiation pattern of the RFID tag. The term "location" includes, for example, the position of the cutout, opening, or aperture on the signage as well as the placement of the RFID tag within the signage or the RFID integrated circuit across the cutout, opening, or aperture. Controlling the radiation pattern can facilitate direction of radiation from the signage toward the roadway and can reduce the amount of radiation that is directed in an unwanted or unproductive direction.

Figure 7:
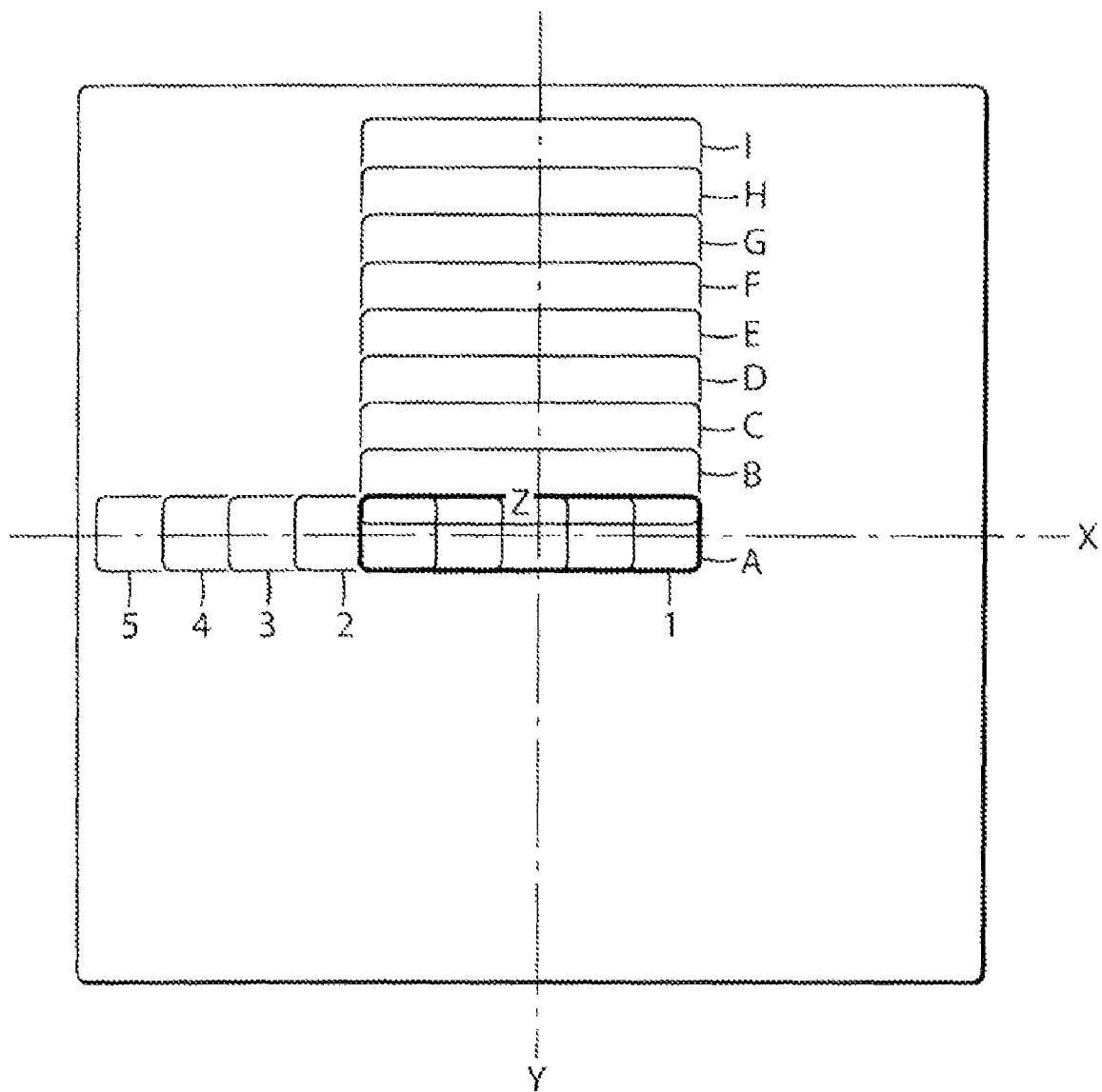
FIG. 7 is a pictorial depiction of the location of multiple cutouts that were cut from various plates for testing the effects of the cutout location.
Figure 8A:
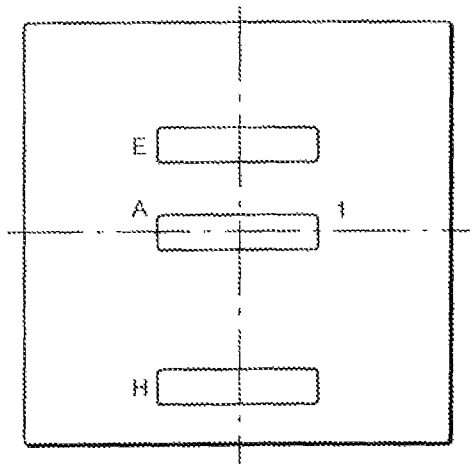
FIGS. 8A, 8B, 8C, and 8D are pictorial depictions of how the thirteen cutout locations shown in FIG. 7 were implemented in four separate pieces of metal plate.
Figure 8B:
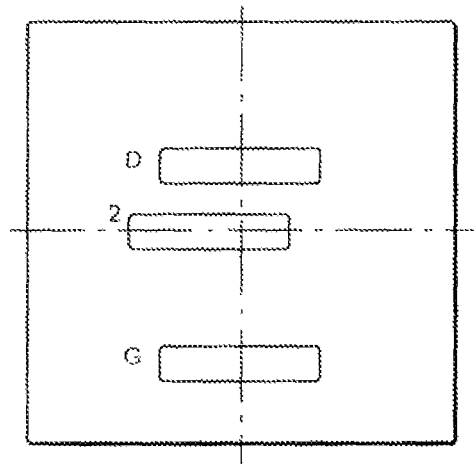
Figure 8C:
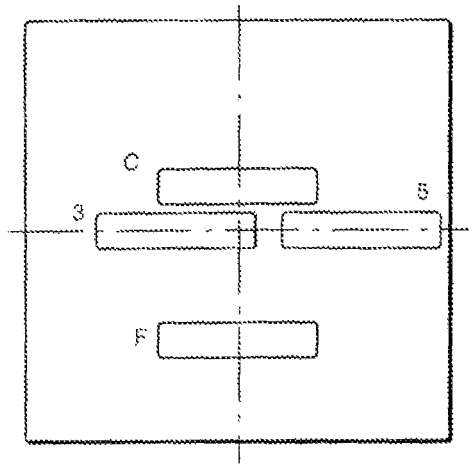
Figure 8D:
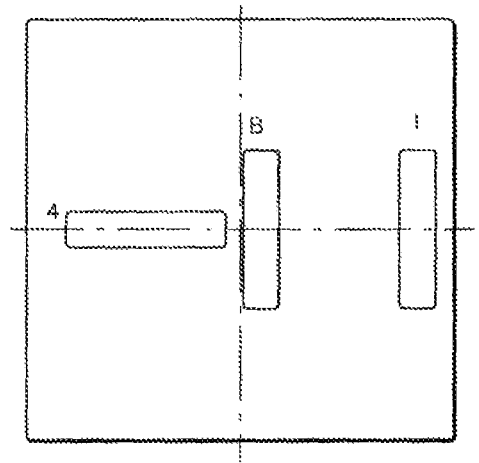

FIG. 7 depicts the location of each of the various cutouts that were cut from various plates for testing the effects of the cutout location. Cutouts 1 through 5 were used to investigate the effect of moving the minor (shorter) edge of the cutout toward the vertical edge of the metal sheet. Cutouts A through I were used to investigate the effect of moving the major (longer) edge of the cutout toward the horizontal edge of the metal sheet. Cutout A is the same as cutout 1.

FIGS. 8A, 8B, 8C, and 8D pictorially show how the thirteen cutout locations shown in FIG. 7 were implemented in four separate pieces of metal plate. The plate of FIG. 8A includes cutout locations A/1, E, and H. The plate of FIG. 8B includes cutout locations D, 2, and G. The plate of FIG. 8C includes cutout locations C, 3, 5, and F. The plate of FIG. 8D includes cutout locations 4, B, and I.

Each cutout was 4.5 inches (11.4 cm) long and 1 inch (2.54 cm) high. The metal plate was a 12 inches (30.48 cm) by 12 inches (30.48 cm) metal plate cut from ⅛ inch (0.317 cm) aluminum stock. During testing, a 915 MHz RFID tag ((a 4 inch long (10.16 cm) and ½ inch (1.27 cm) high Squiggle™ RFID tag manufactured by Alien Co.)) was placed in the center of one of the cutouts located in a single metal plate. The unused cutouts on each metal plate being tested were covered with copper tape during testing of a particular cutout. When cutouts 1 through 5 were tested, the metal plate was rotated about the y-axis (as shown in FIG. 7) with 90 degrees being normal to the plate and 0 degrees being off the left side of the plate. When cutouts A through I were tested, the metal plate was rotated about the x-axis (as shown in FIG. 7) with 90 degrees being normal to the plate and 0 degrees being off the top edge of the plate. The read performance of each plate was measured by placing an attenuator in between an RFID reader and a reader antenna. The attenuation was increased in 1 dB increments until the tag could no longer be read. This testing was performed in an anechoic chamber at a fixed distance between the circularly polarized reader antenna and the metal plate including the RFID tag.

Figure 9:
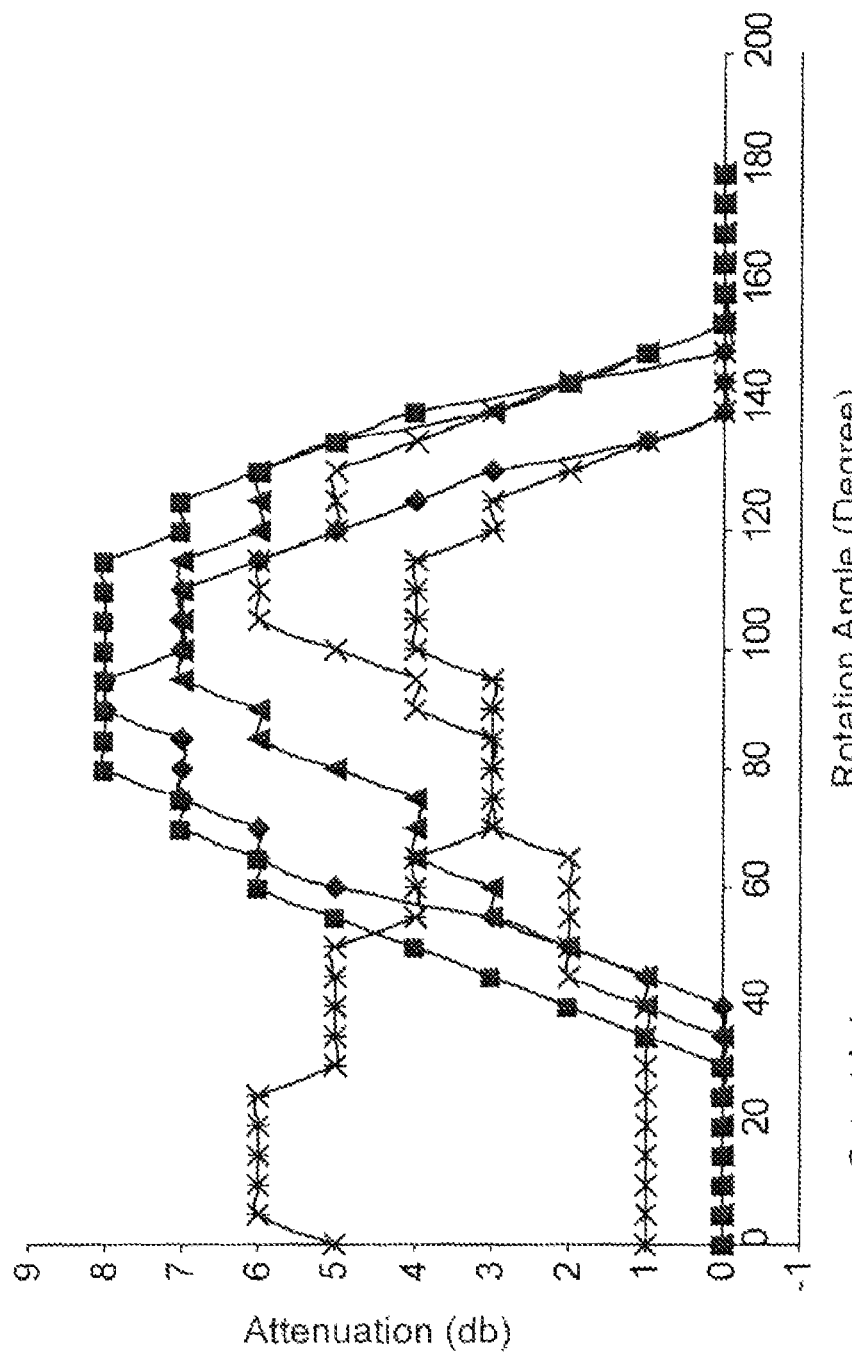
FIG. 9 is a graph that shows the effective radiation pattern of an RFID tag in cutouts A through I.

FIG. 9 shows the effective radiation pattern of an RFID tag positioned in cutouts A, C, E, G, and I. The effective radiation pattern of an RFID tag positioned in cutouts B, D, F, and H was not tested. FIG. 9 shows that the radiation pattern for an RFID tag in a cutout near the center of the plate (e.g., cutouts A and C) is nearly symmetrical about 90 degrees (nearly normal to the plate). As the cutout location is moved toward the top of the plate (e.g., cutouts E and G), the radiation pattern shifts away from 90 degrees towards 120 degrees. For cutout I, the radiation pattern is maximum at 15 degrees, nearly off the edge of the plate.

These results allowed the present inventors to conclude that by controlling the placement of the cutout and RFID tag, one could create a sign including RFID functionality that was tailored for its intended placement and use. In other words, by controlling the spacing between the edge of the metal plate and the major side/surface of the cutout, the radiation pattern could be controlled. For example, a sign could be created that was best read from a location at an off-angle by placing the cutout and RFID tag toward the edge of the metal plate, e.g., at the cutout I location. Alternatively, a sign could be created that was best read from a location normal to the sign by placing the cutout and RFID tag toward the middle of the metal plate, e.g., at the cutout A/1 location.

Figure 10:
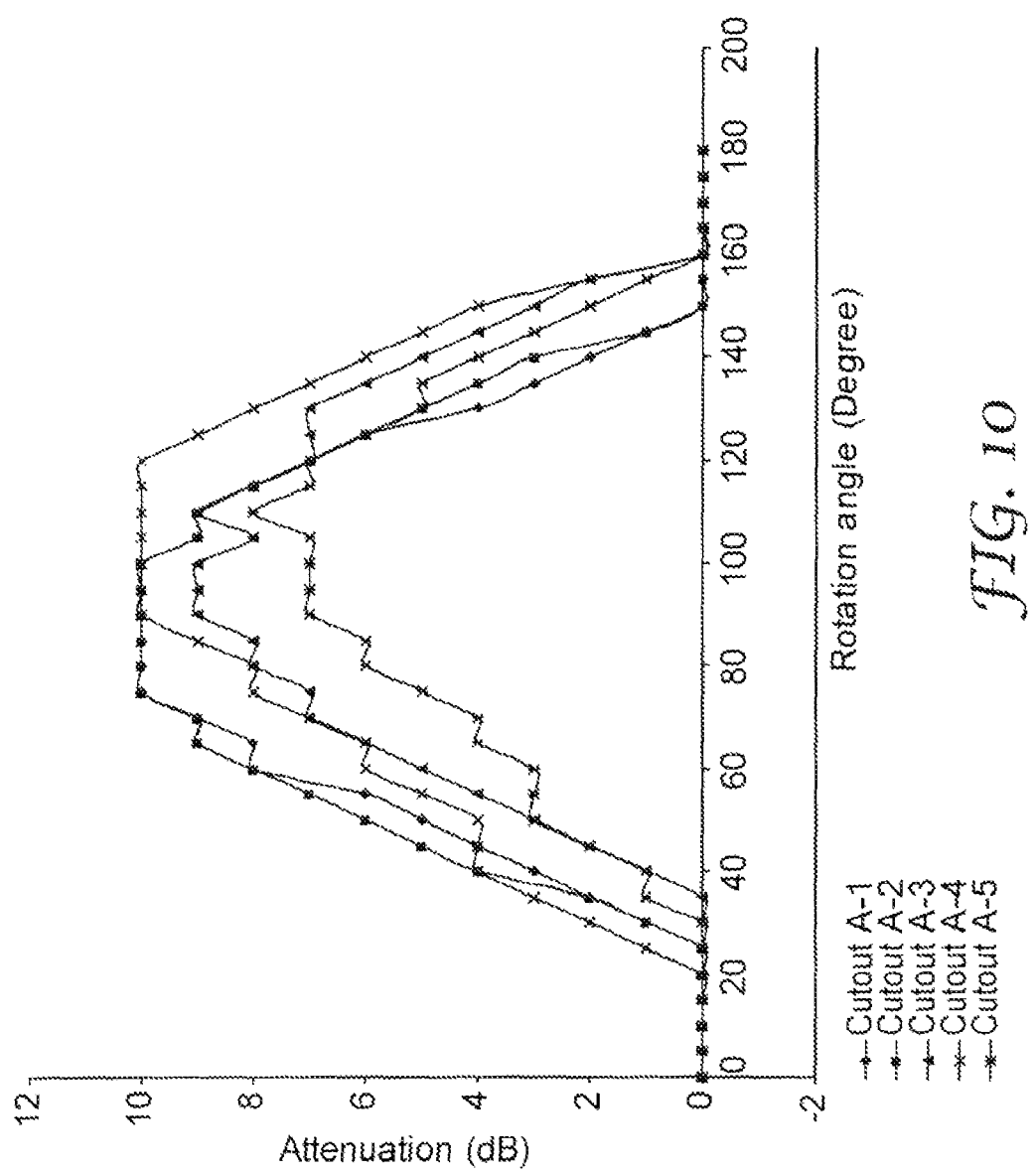
FIG. 10 is a graph that shows the effective radiation pattern of an RFID tag in cutouts 1 through 5.

FIG. 10 shows the effective radiation pattern of cutouts 1 through 5. All of these cutouts resulted in a maximum radiation that is normal to the plate at about 90 degrees. Thus, controlling the location between the minor side of the cutout and the plate edge did not appear to be an effective method of controlling the effective radiation pattern.

As was described above, the performance results shown in FIGS. 9 and 10 are based on a metal sign in which the RFID tag is centered in the cutout (centered along the x-axis and the y-axis and the z-axis of the cutout). Based on the fact that the metal plate was ⅛ inch (0.317 cm) thick, this meant that the RFID tag was positioned at approximately 1/16 inch (0.15 cm) from each major surface (the front and back surfaces) of the metal plate.

Figure 11:
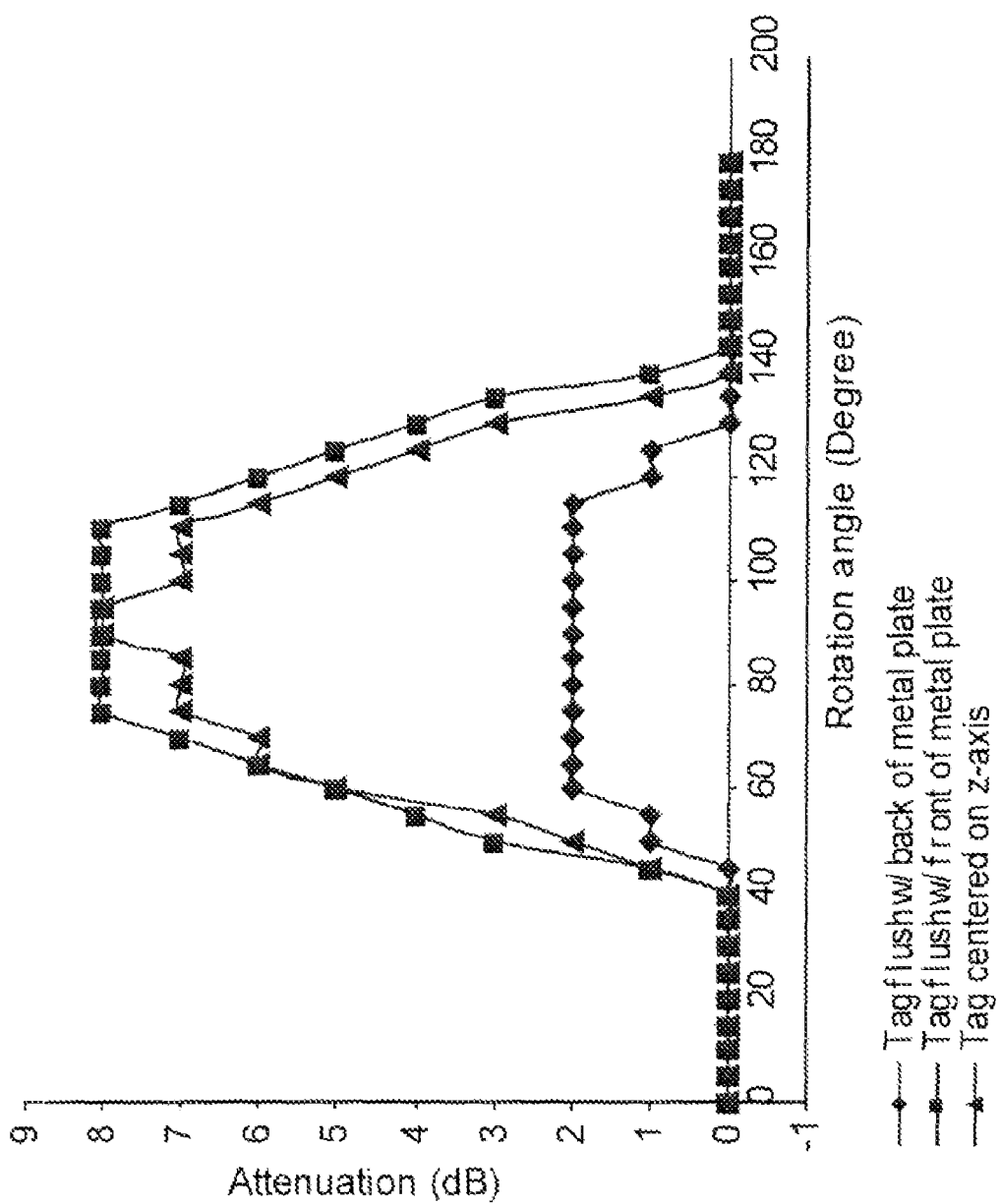
FIG. 11 is a graph that shows the effect of having an RFID tag centered along the x-axis and y-axis of a cutout but at different locations along the z-axis of the cutout.

FIG. 11 shows the effect of having the RFID tag centered along the x-axis and y-axis of the cutout (at position A/1) but at different locations along the z-axis of the cutout. In other words, the RFID tag was placed at different thicknesses within cutout A/1. The results shown in FIG. 11 allowed the present inventors to conclude that when the tag is centered within the thickness of cutout A/1 (or along the z-axis), the tag performs about 6 dB better from the front of the plate than if the tag is flush with the back of the metal plate. This effect can be used to control the radiation pattern. For example, if the tag is centered within the cutout (along the z-axis), then the tag will radiate fairly well normal to both the front and the back of the metal plate (or sign). If the tag is flush with the front of the metal plate (or sign), the tag will radiate better off of the front of the plate than off of the back of the plate. If the tag is flush with the back of the metal plate (or sign), the tag will radiate better off of the back of the plate than off of the front of the plate.

EXAMPLE 3

Figure 12:
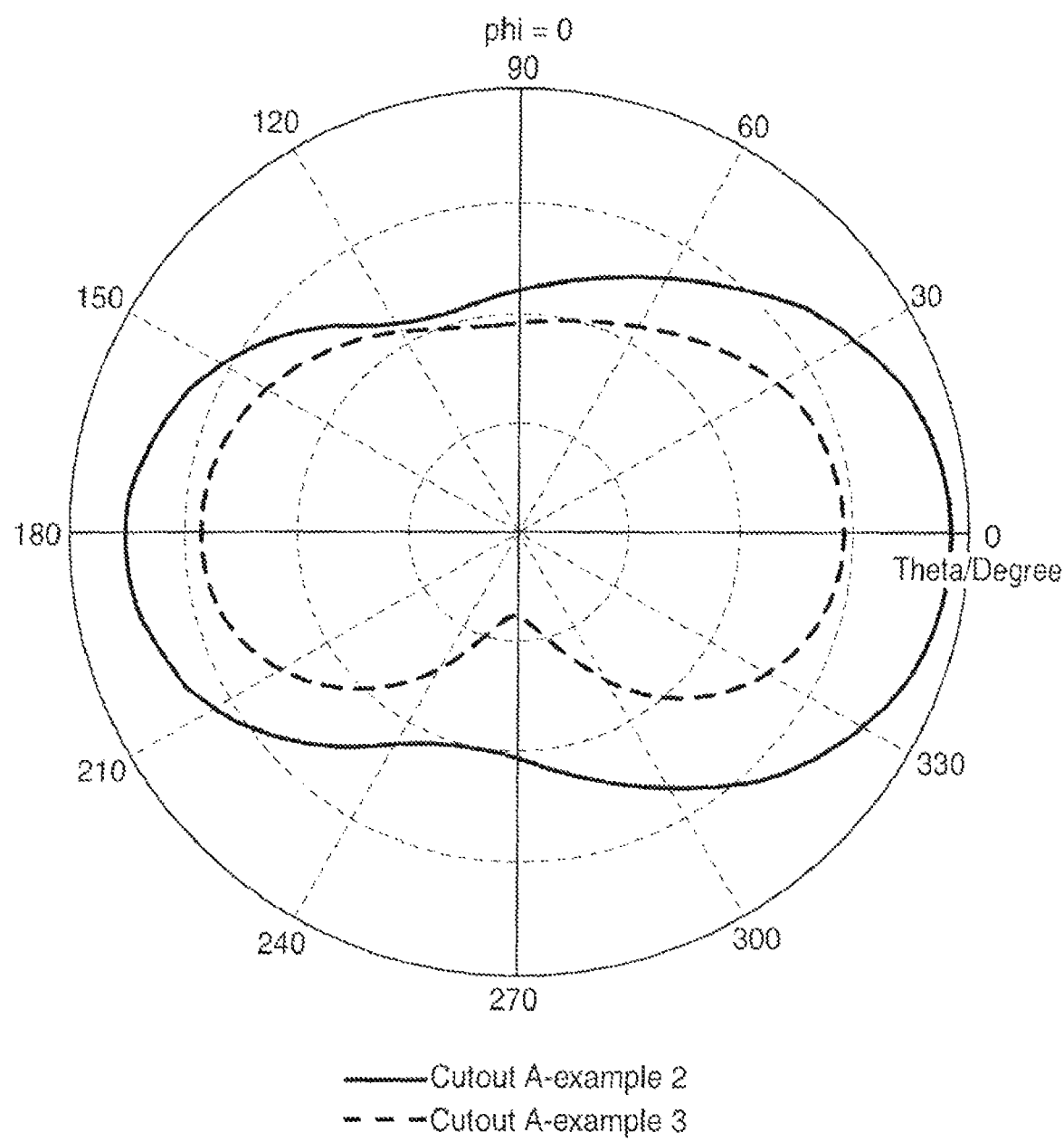
FIG. 12 is a modeled radiation profile relating to the sample described in Example 3.

The following example was modeled to determine the effect of changing the y dimension of the cutout with the tag centered in the x and y dimensions with respect to the metal plate and located flush with the front of the plate (along the z dimension). A 4.5 inches (11.43 cm) long and 3.5 inches (8.89 cm) high cutout in position A (as described above) was modeled in a metal plate measuring 12 inches (30.48 cm) by 12 inches (30.48 cm) and made of ⅛ inch (0.137 cm) aluminum stock. The cutout used for this model was identical to cutout A except that the y dimension was made to be 3.5 inches (8.89 cm) by moving the upper edge of the cutout upward. The results are shown in FIG. 12. FIG. 12 shows that when the y dimension of the cutout is enlarged, the radiation pattern changes with a reduction in directivity. Thus the size of the cutout can be used to change or optimize the radiation pattern.

EXAMPLE 4

Figure 13:
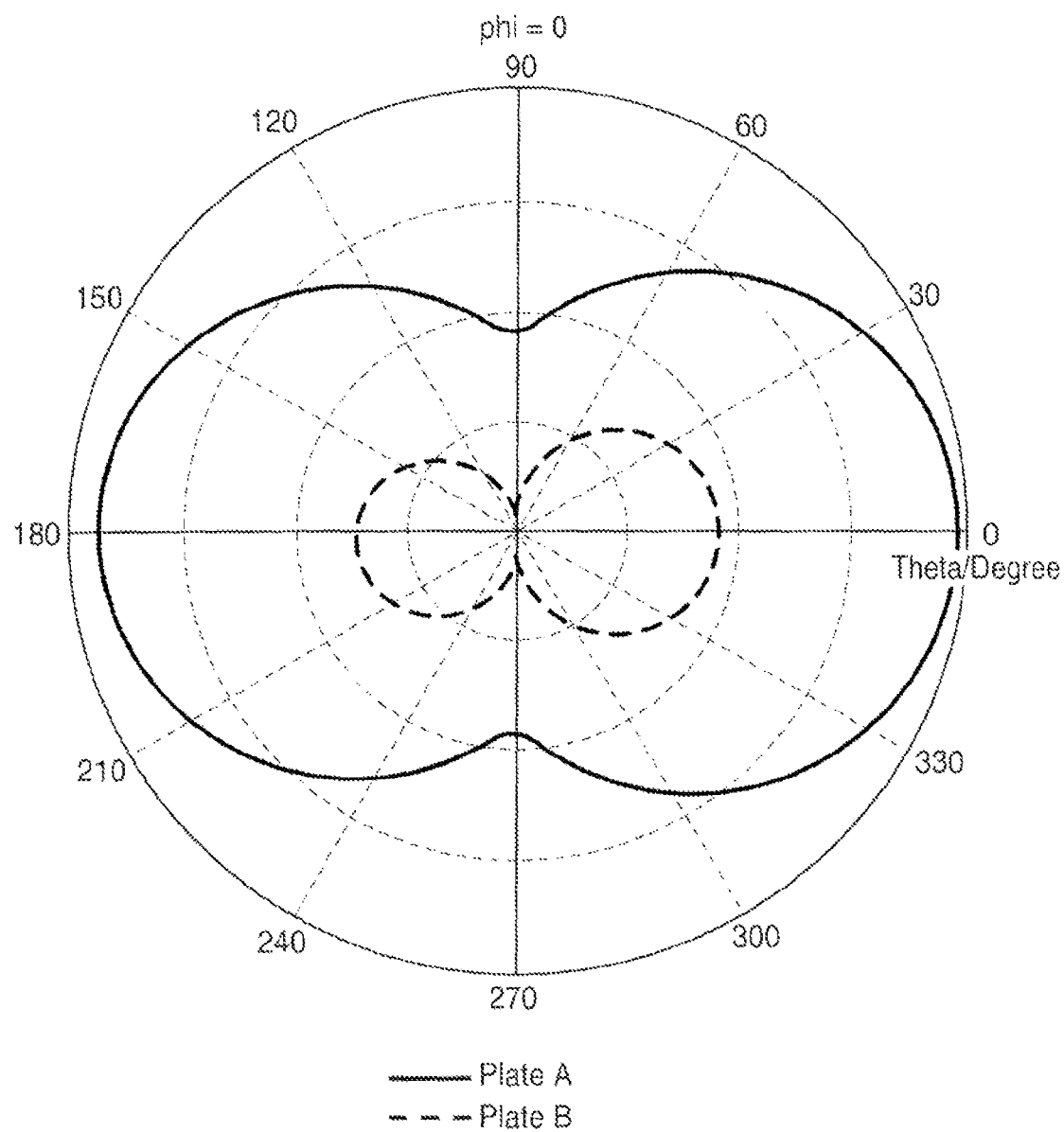
FIG. 13 is a modeled radiation profile relating to the sample described in Example 4.

The following example was modeled to determine the effect of changing the metal plate size while keeping the cutout with the tag centered in the x and y dimensions with respect to the metal plate and located flush with the front of the plate (along the z dimension). Two separate metal plates of differing sizes were modeled. Both plates were metal plates made of ⅛ inch (0.137 cm) aluminum stock and the cutout in each plate measured 4.5 inches (11.43 cm) long and 1 inch (2.54 cm) high. The size of Plate A was 12 inches (30.48 cm) by 12 inches (30.48 cm), and the size of Plate B was 6 inches (15.24 cm) by 6 inches (15.24 cm). The modeling results are shown in FIG. 13. FIG. 13 shows that when the y dimension of the cutout is enlarged, the radiation pattern changes with a reduction in directivity. Thus the size of the cutout can be used to change or optimize the radiation pattern.

EXAMPLE 5

Figure 14:
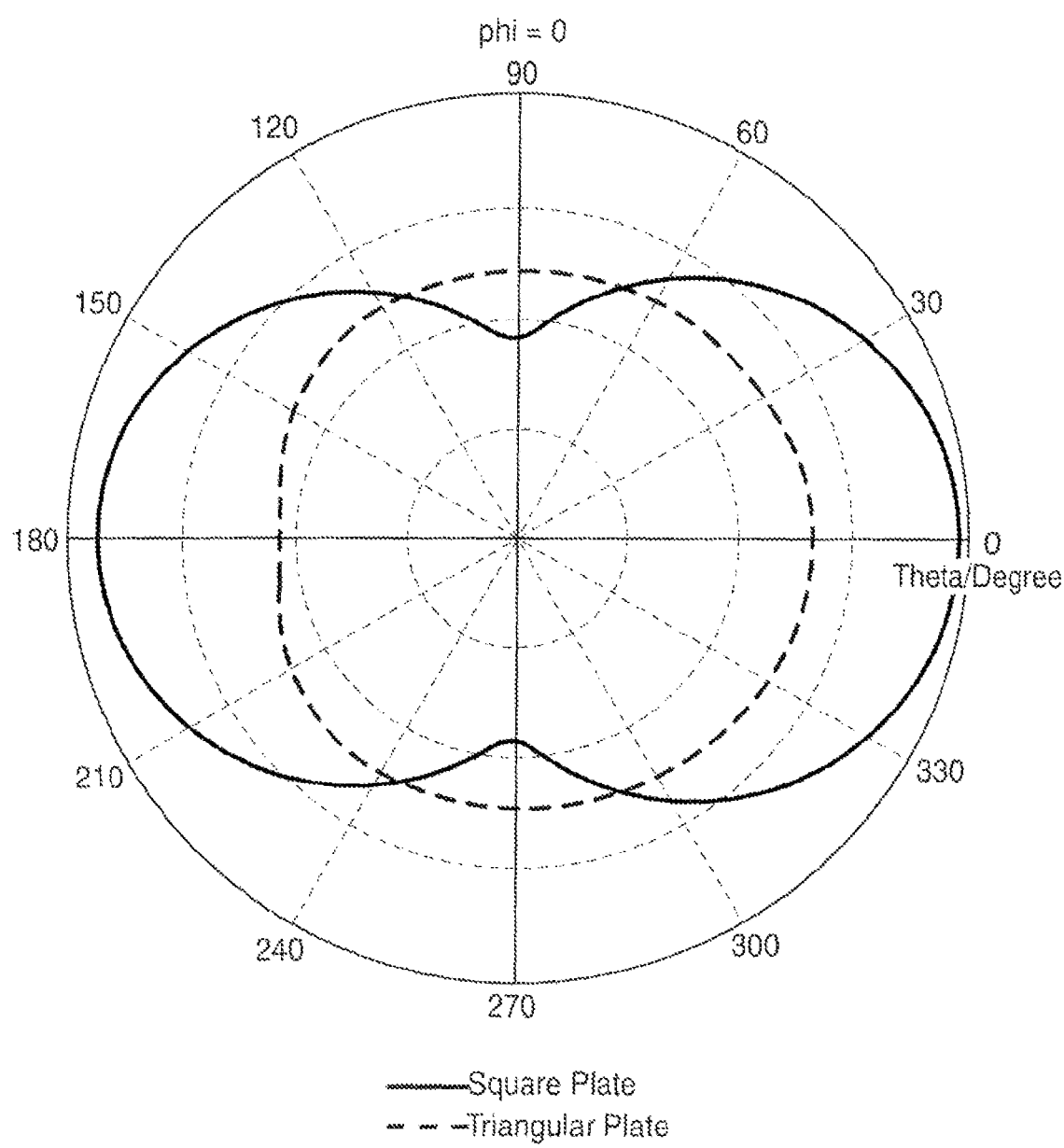
FIG. 14 is a modeled radiation profile relating to the sample described in Example 5.

The following example was modeled to determine the effect of changing the metal plate shape while keeping the cutout with the tag centered in the x and y dimensions with respect to the metal plate and located flush with the front of the plate (along the z dimension). Two separate metal plates of differing shapes were modeled. Both plates were metal plates made of ⅛ inch (0.137 cm) aluminum stock and the cutout in each plate measured 4.5 inches (11.43 cm) long and 1 inch high (2.54 cm). The plate shapes modeled were a square and a triangle. The square plate measured 12 inches (30.48 cm) by 12 inches (30.48 cm). The triangle plate had a base of 12 inches (30.48 cm) and sides of 13.2 inches (33.53 cm), i.e., a height of 12 inches (30.48 cm). The modeling results are shown in FIG. 14. FIG. 14 shows that when the shape of the metal plate is changed, the radiation pattern changes. Thus the shape of the metal plate can be used to change or optimize the radiation pattern.

The same effects in the radiation patterns for cutout size, signage size, and signage shape are expected to apply for signage developed with the electrically conductive component being a sheeting applied to the substrate.

II. Signage Constructions Including a Slot Antenna and an Electrically Conductive Substrate Another exemplary embodiment of the present invention includes forming a cutout, opening, slot, or aperture in an electrically conductive substrate such that the conductive substrate operates as an antenna for an RFID integrated circuit that is coupled to the substrate. This cutout, opening, or aperture creates what can be referred to as a "slot antenna," which has radiation pattern properties similar to that of a dipole antenna. When an RFID chip is attached to the electrically conductive substrate, such as, for example, a metal street sign, the slot antenna interfaces with the RFID chip. Thus RFID functionality can be associated with an electrically conductive signage by (1) creating a cutout, opening, slot or aperture in an electrically conductive substrate to form a slot antenna; and (2) attaching an RFID chip to the electrically conductive substrate such that the slot antenna formed within the signage functions as the RFID antenna and such that the resulting electrically conductive substrate has RFID functionality. The present inventors recognized that the relatively large form factor of the signage can create a very efficient radiator if the aperture is designed and driven appropriately.

Silicon integrated circuit chips generally have a low resistance and a large negative reactance. There are two methods of achieving power transfer; design a matching network to transform the chip impedance to the antenna impedance or design the RFID antenna to directly match the chip impedance. In many RFID applications, the space constraints dictate using the latter approach. However, in signage applications, the form factor can be significantly larger than in many other applications, allowing both options to be viable. Consequently, the present inventors investigated both the integrated matching network approach and the direct antenna matching approach, both of which are included in the present application.

A. Slot Antenna with an Integrated Matching Network

In this implementation of signage articles including a slot antenna, the slot antenna may be designed independent of the chip impedance and may use a matching network to transform the impedance between the RFID chip and the antenna. One advantage of this design is that the antenna design remains constant. However, the matching network components will have to be adjusted based on the specific RFID chip that is implemented in the design.

Figure 5A:
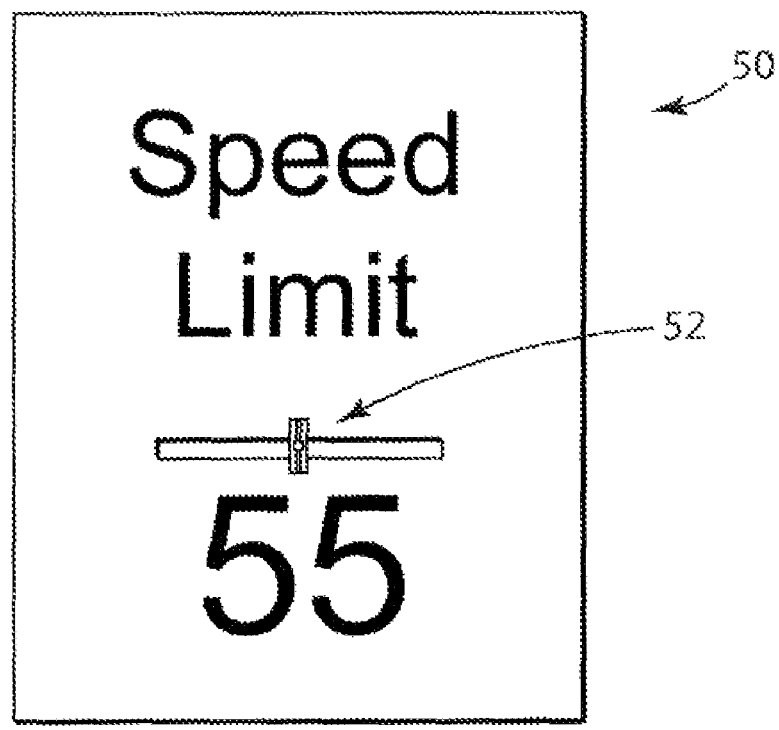
FIG. 5*a* is a schematic view of one embodiment of a traffic signage article used as an RFID tag antenna.
Figure 5B:
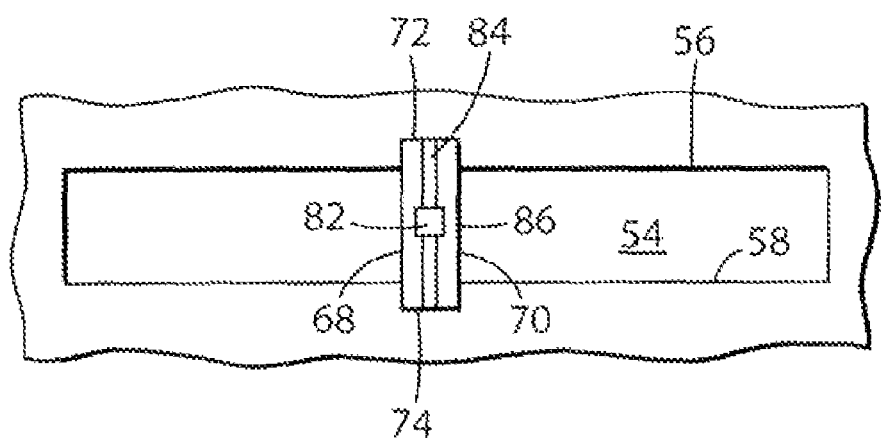
FIG. 5*b* is an exploded view of the RFID tag of FIG. 5*a*.

One exemplary implementation of this embodiment is shown in FIGS. 5a and 5b. FIG. 5a is a schematic view of a metal speed limit sign 50 including a radio frequency-responsive element 52. FIG. 5b is an exploded view of the portion of sign 50 including radio frequency-responsive element 52. In FIG. 5b, sign 50 includes a rectangular cutout, opening, or aperture 54 having a top major surface 56 and a bottom major surface 58. Aperture 54 is made in a major surface of a substrate (the substrate may be as is described above with respect to the "cutout" applications of the present application). An RFID tag or chip 82 is attached to a conductive interconnect 84 that is attached to a strap 86 (sometimes called an interposer) having a first major side 68, a second major side 70, a first minor side 72, and a second minor side 74. First minor side 72 of strap 86 is positioned adjacent to top major surface 56 of aperture 54 and second minor side 74 of strap 86 is positioned adjacent to bottom major surface 58 of aperture 54. Consequently, strap 86 is attached to sign 50 such that strap 86 is positioned vertically within the horizontal aperture 54 and such that the RFID chip 82 is positioned within or adjacent to aperture 54. Strap 86 may have an electrically direct contact to the conductive signage, or may be capacitively coupled to the signage. Strap 86 is preferably a flexible substrate that provides electrical and physical connection of the RFID chip to the signage. Consequently, strap 86 physically and electrically ties the metal of sign 50 to the RFID chip 82. Because strap 86 can be placed directly across aperture 54 and aperture 54 acts as a slot antenna, there is no need to fabricate a separate tag antenna.

An RFID reader (not shown) induces signals across the aperture which the strap routes to the RFID chip. It is important that there be no metal inside or covering the aperture. So, non-metallic reflective or other dielectric material sheeting could be used in this area, such as, for example, Diamond Grade™ reflective sheeting manufactured by 3M Company of St. Paul, Minn. Alternatively, a companion aperture could be cut into metallic reflective sheeting, as was described above in greater detail.

In this implementation, strap 86, interconnect 84, and RFID chip 82 are preferably relatively flush with sign 50. Alternatively, they may be positioned within the thickness of sign 50. This facilitates the stacking of multiple signs on top of one another without causing injury or damage to the RFID chip attached to or associated with the sign. Strap 86 preferably has a minimal thickness, for example, a thickness between about 0.5 mil and about 5 mils.

Those of skill in the art will appreciate that many changes can be made to the embodiment shown in FIGS. 5a and 5b without departing from the spirit of the concept. For example, although strap 86 is shown as attached to the front face of sign 50 in FIGS. 5a and 5b, strap 86 can also be attached to the rear face of sign 50 (not shown) or within the thickness of sign 50. Also, aperture 54 need not be rectangular in shape; aperture 54 can be of any desirable shape (e.g., tapered slots and annular rings) and can be placed in any desirable location on sign 50 including the use of multiple slots or arrays of slots. Additionally, the signage may include an array of apertures, which may increase the antenna directivity and the read-range as well as modify the radiation pattern. Further, sign 50 need not be a rectangular speed limit sign, but can be any shape or form of signage. Additionally, strap 86 can be shaped differently (e.g., wider, shorter, longer, thinner) than shown in FIGS. 5a and 5b.

The following example describes one exemplary construction of a signage described above as well as reporting some of the performance results of the signage construction.

EXAMPLE 6

Figure 15:
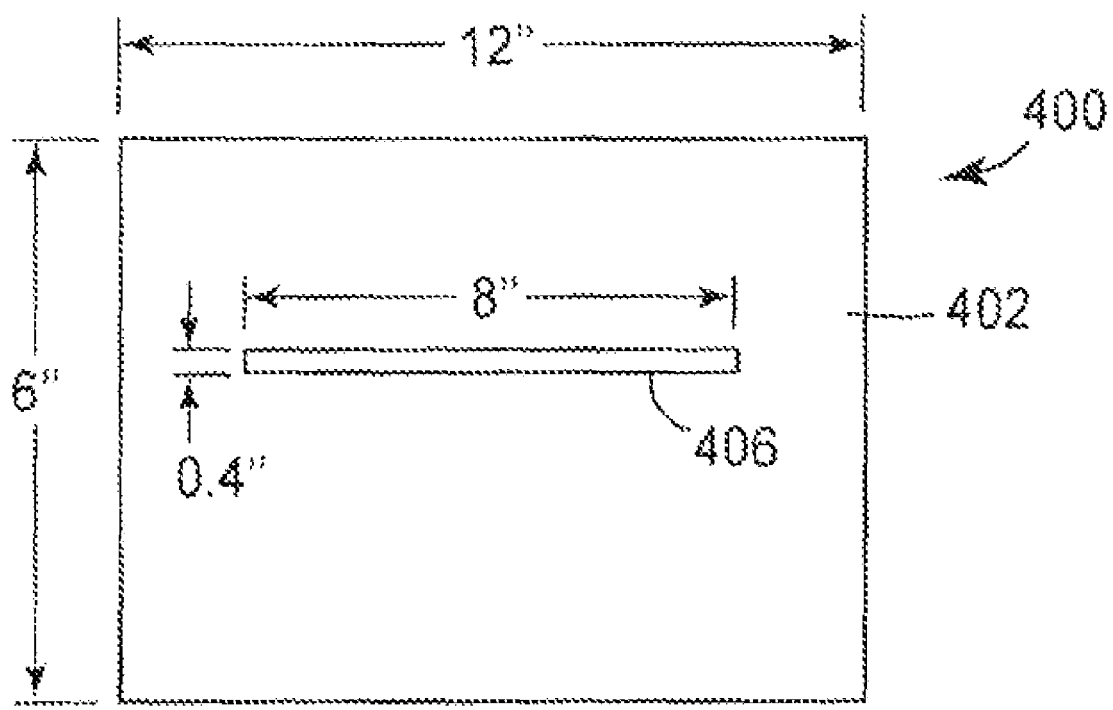
FIG. 15 is a schematic view of a slot design.

A 50-ohm slot antenna was designed for operation at 915 MHz using standard slot design equations. The antenna was modeled using CST Microwave Studio™ and measured on a network analyzer. A schematic view of the slot design is shown in FIG. 15. A single side metallized FR4 PC board 402 measuring 6 inches (15.24 cm) by 12 inches (30.48 cm) was used as a substrate (the approximate size of a standard United States license plate). Slot antenna 400 measured 8 inches (20.32 cm) by 0.4 inch (1.02 cm) and was created by mechanically etching the copper from the PC board surface.

Figure 16A:
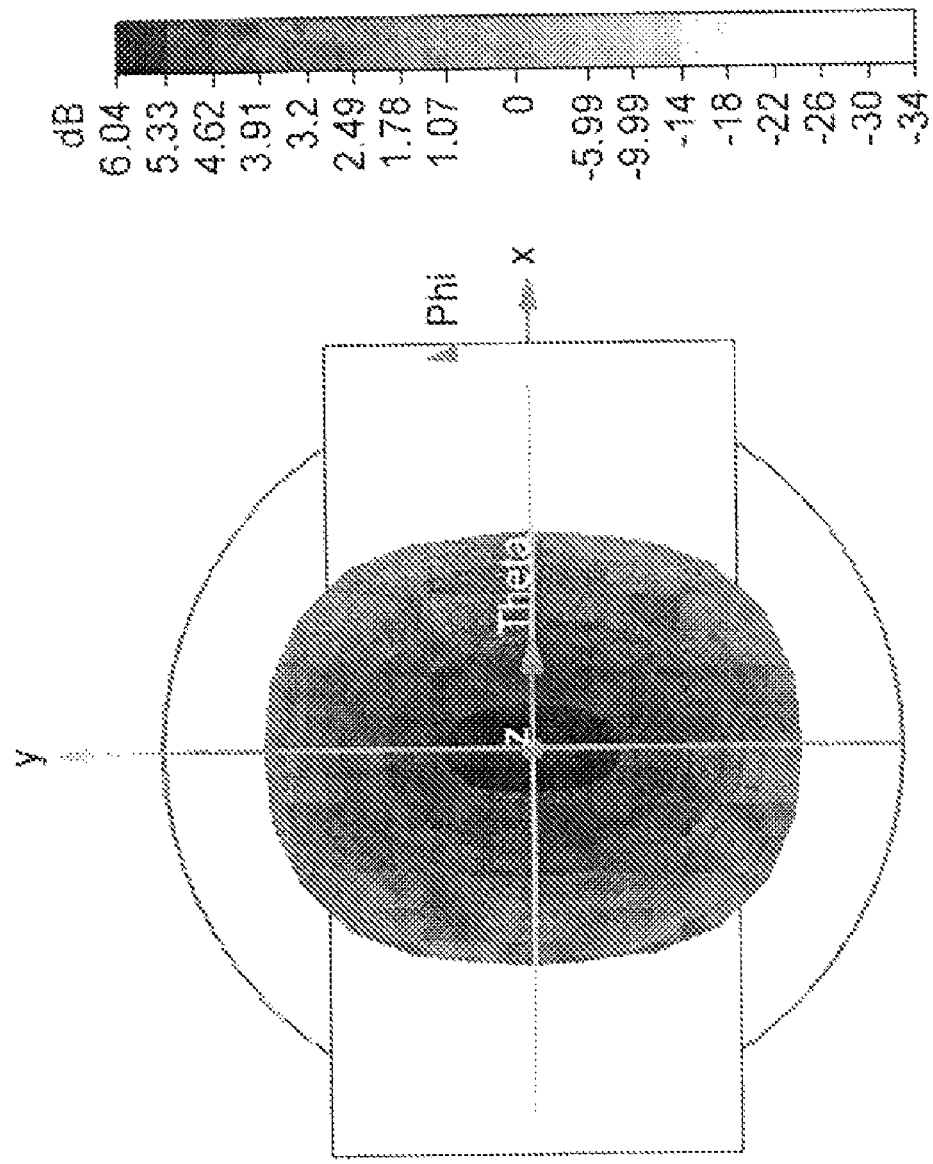
FIGS. 16a and 16b shows the respective front and side view modeled radiation profile of the slot antenna of FIG. 15.
Figure 16B:
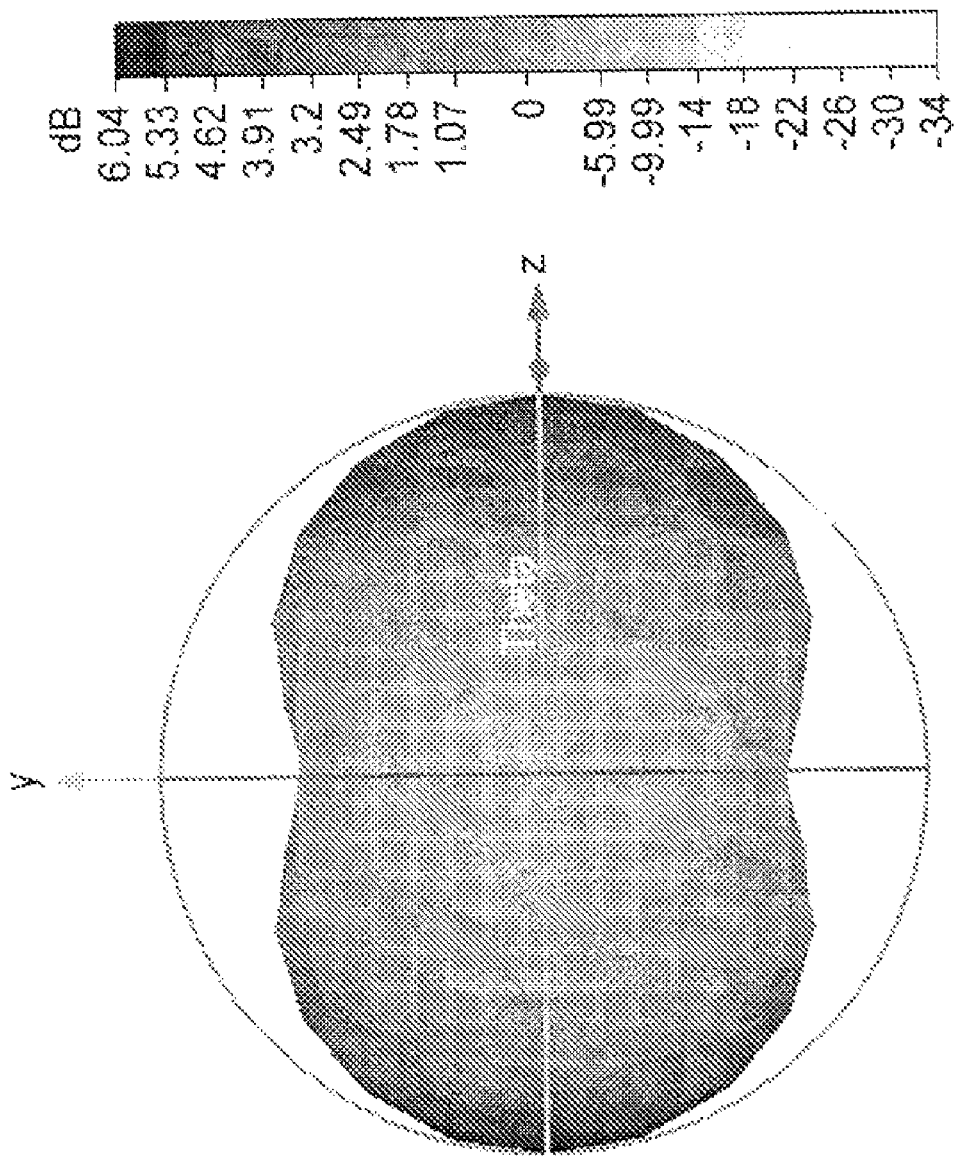

FIGS. 16a and 16b show the modeled radiation profile of the slot antenna of FIG. 15. FIGS. 16a and 16b show that the slot antenna of FIG. 15 focuses radiation with a directivity of 6 dBi. For comparison, a typical RFID antenna (i.e., a dipole antenna) typically has a directivity of approximately 2 dBi.

In at least some embodiments, using the metal of the electrically conductive sign facilitates the readability of the RFID chip. In these embodiments, the electrically conductive sheeting and/or the metal substrate of certain types of signage acts as the RFID antennae. Thus the metal signage assists in the performance of the RFID chip rather than hindering its performance. Consequently, the read-range performance is enhanced in at least some embodiments.

When additional control of the radiation pattern is desired (i.e., control of nulls and/or beam lobes), it can be useful to include additional slots in the conductive signage to act as additional beam forming elements. These slots could be used as passive antenna elements to create a beam forming array, such as in a yagi or other multi-element antenna array design. For example, the elements can be arranged in an array of elements to increase the antenna directivity and possibly control the angle of maximum radiation. An array of elements includes, for example, multiple slots that are electrically coordinated by spacing and/or phasing to produce a desired radiation pattern.

The present inventors recognized that changing the shape or size of the plate can result in changes in the direction of the radiation patterns. For example, the diffraction from the edges of the plate can cause the radiation pattern to change as the size and shape of the plate changes. In some embodiments, it may be desirable to create an omni directional antenna pattern, while in other instances it may be preferred to have a more directional antenna pattern. For example, it may be desirable to have roadside signage with an antenna pattern directed toward the road traffic that it is intended to address. Modeling was used to investigate how the pattern of a slot antenna can be impacted by the size of the metal plate in which it is implemented. Various exemplary plates were modeled and the results are shown in the Example below.

EXAMPLE 7

Figure 17A:
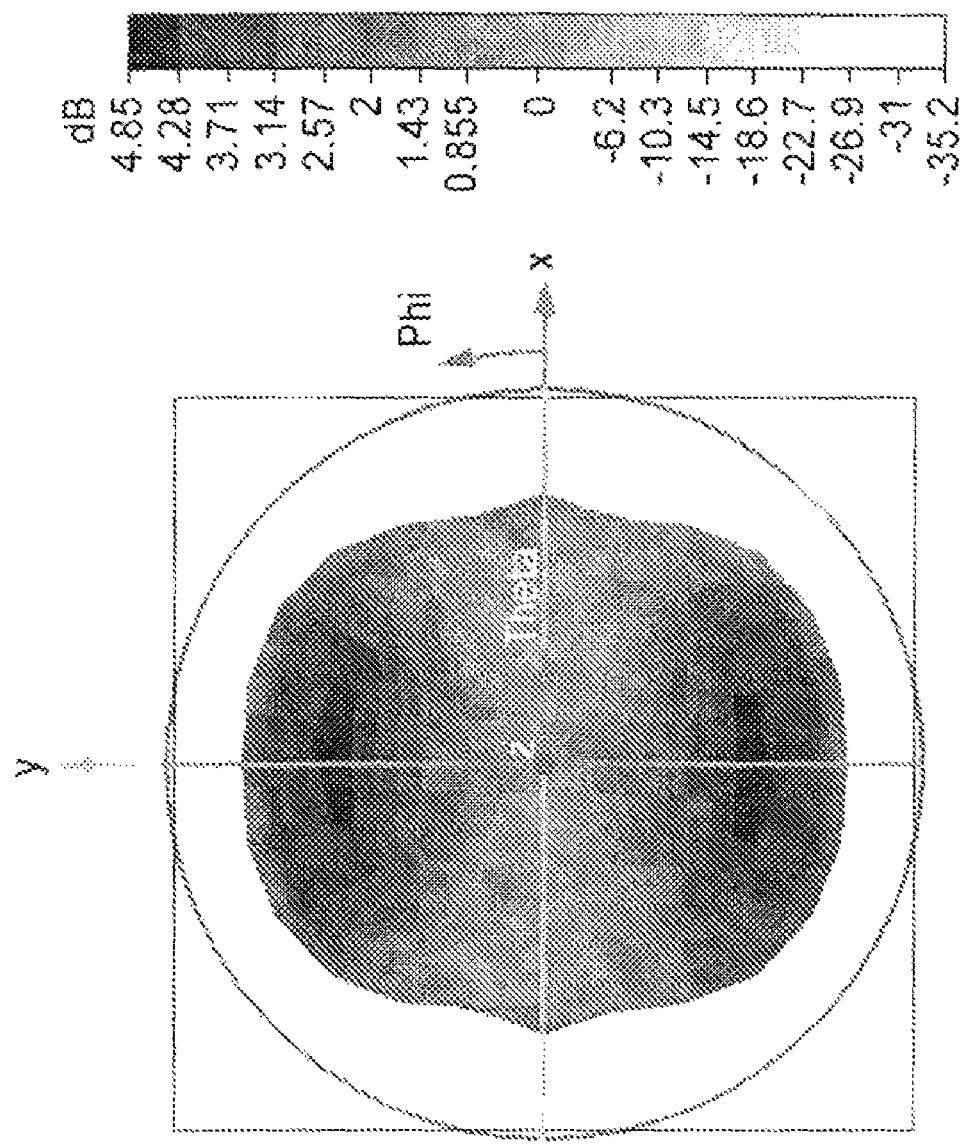
FIGS. 17a and 17b show the respective front and side view antenna pattern for Plate #2 of Example 7.
Figure 17B:
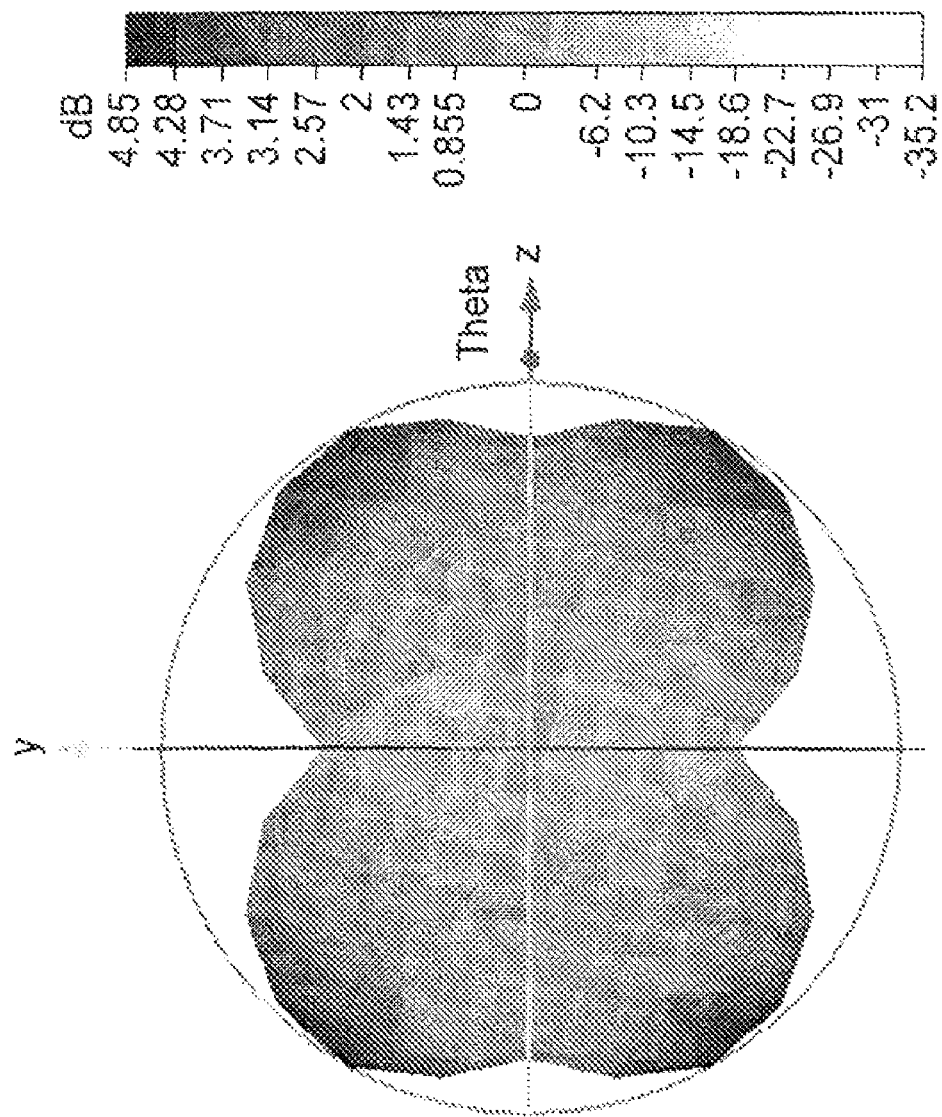
Figure 18A:
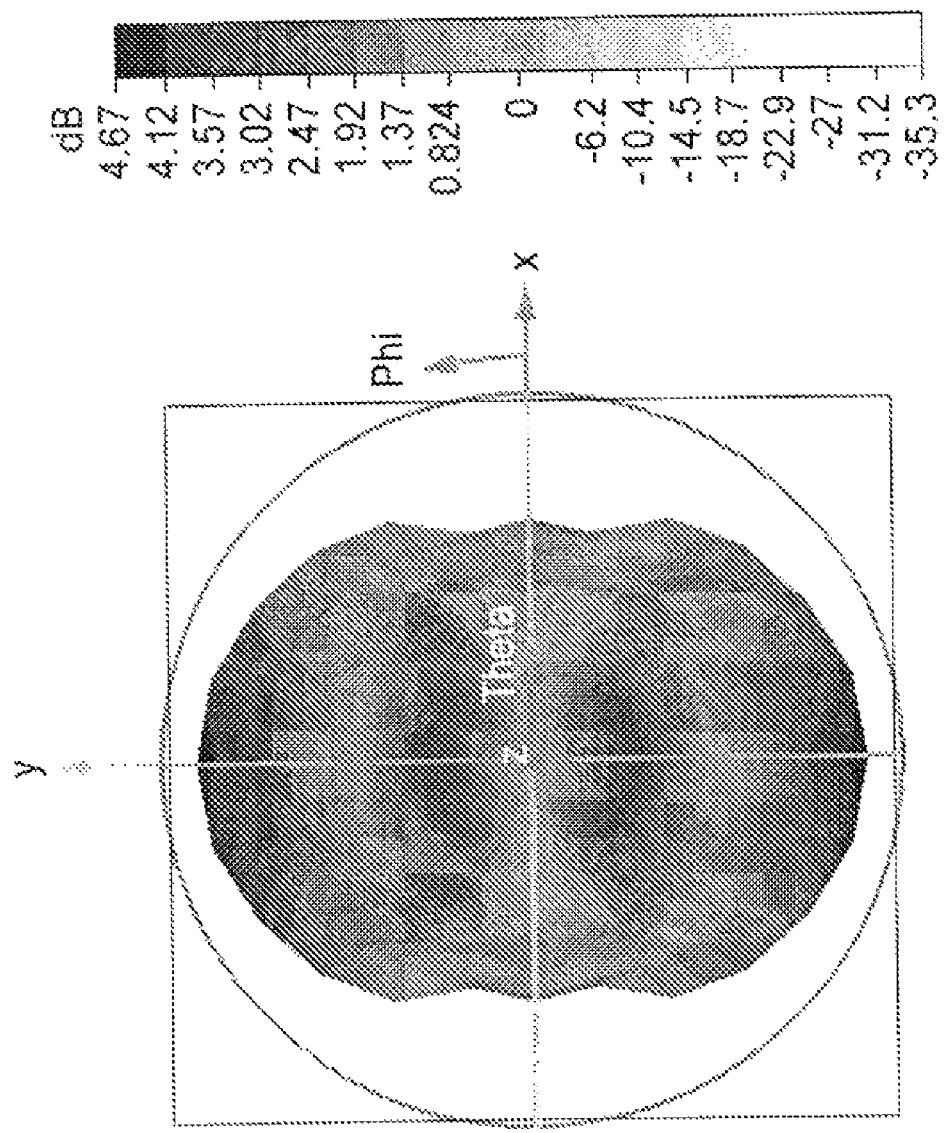
FIGS. 18a and 18b show the respective front and side view antenna pattern for Plate #3 of Example 7.
Figure 18B:
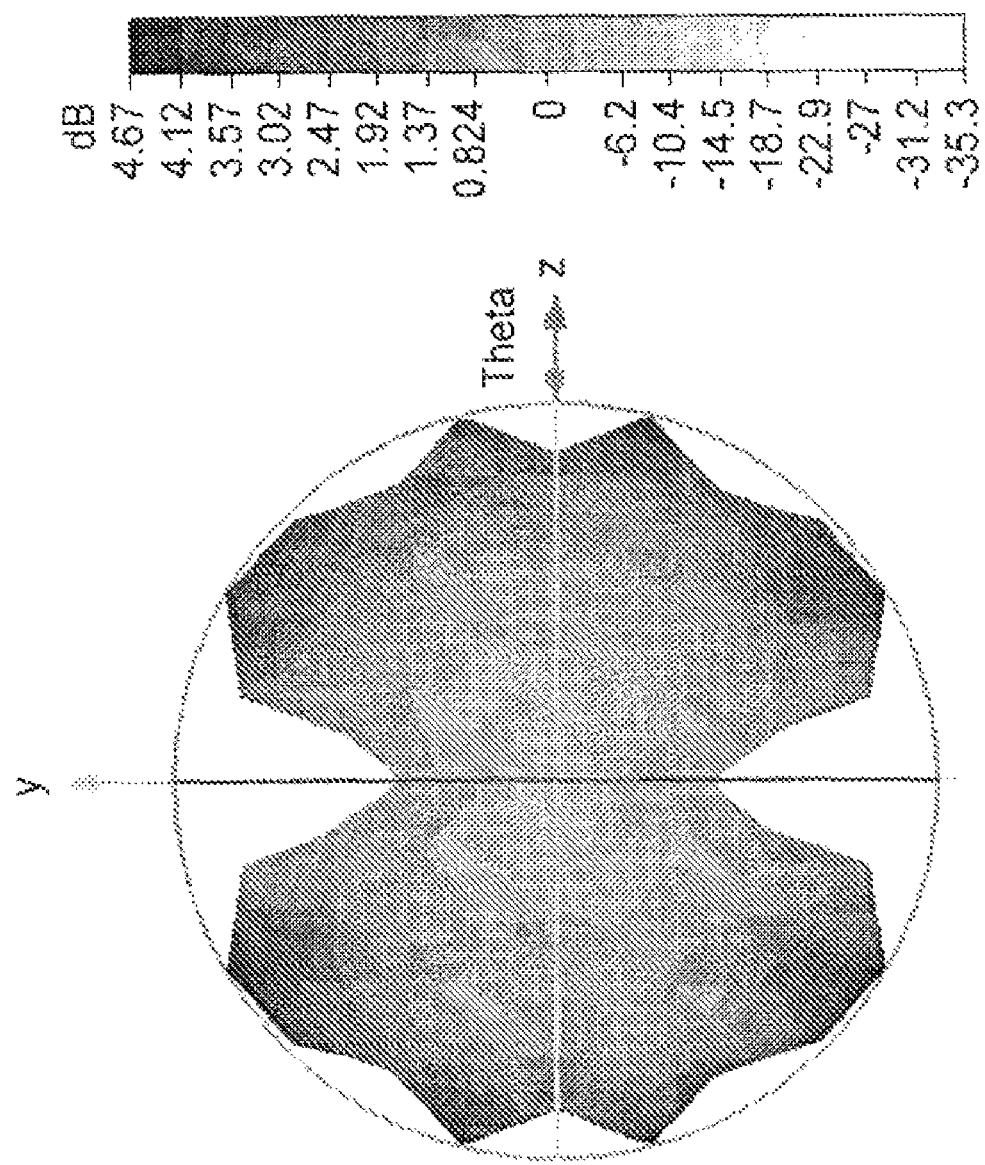

A 900 MHz 50 ohm slot antenna was modeled such that it was centered in three plates of various sizes. Plate #1 measured 0.5 foot by 1 foot; Plate #2 measured 2 feet by 2 feet; and Plate #3 measured 4 feet by 4 feet. The resultant antenna patterns are shown in FIGS. 16-19. Specifically, the antenna pattern for Plate #1 is shown in FIGS. 16a and 16b (where FIG. 16a is the front view and FIG. 16b is the side view); the antenna pattern for Plate #2 is shown in FIGS. 17a and 17b (where FIG. 17a is the front view and FIG. 17b is the side view); and the antenna pattern for Plate #3 is shown in FIGS. 18a and 18b (where FIG. 18a is the front view and FIG. 18b is the side view). Finally, FIG. 19 facilitates a comparison between FIGS. 16-17.

Figure 19:
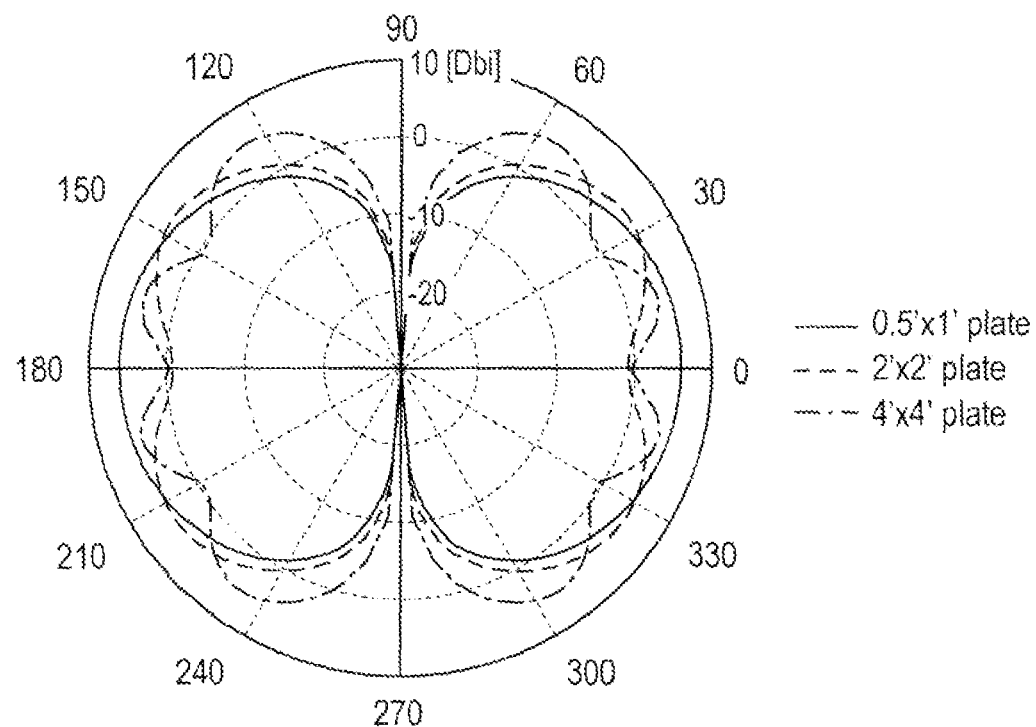
FIG. 19 is a comparison of the E-plane (y-z plane) antenna patterns shown in FIGS. 16-18.

FIGS. 16-19 show that increasing the plate size increases the radiation off of the broadside of the plate and shows that increase in plate size increases ripple in the radiation pattern. FIG. 19 indicates that of the three plate sizes modeled, the slot in the 0.5 foot by 1 foot plate would produce the greatest read-range normal to the plate, but the worst read-range at angles far from the normal. FIG. 19 also indicates that at approximately 60 degrees from the normal, of the plates modeled, the largest plate produces the best read-range.

EXAMPLE 8

Figure 25A:
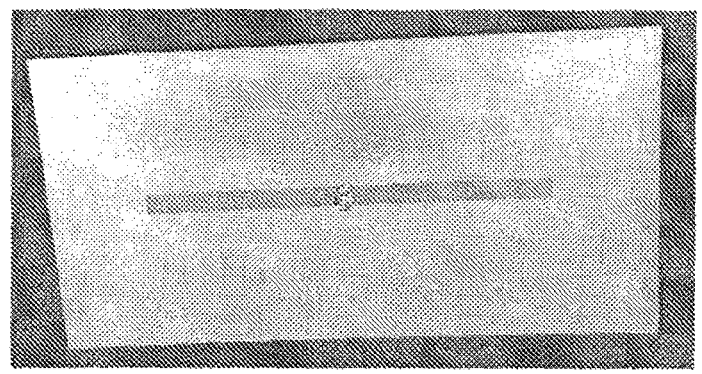
FIGS. 25a and 25b are schematic views of a flush mounted integrated tag with a matching circuit.
Figure 25B:
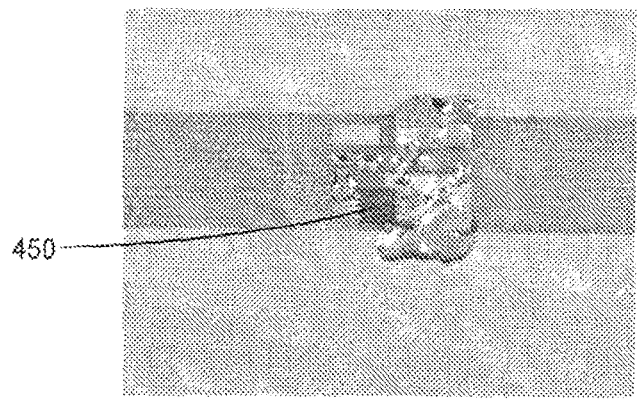
Figure 26:
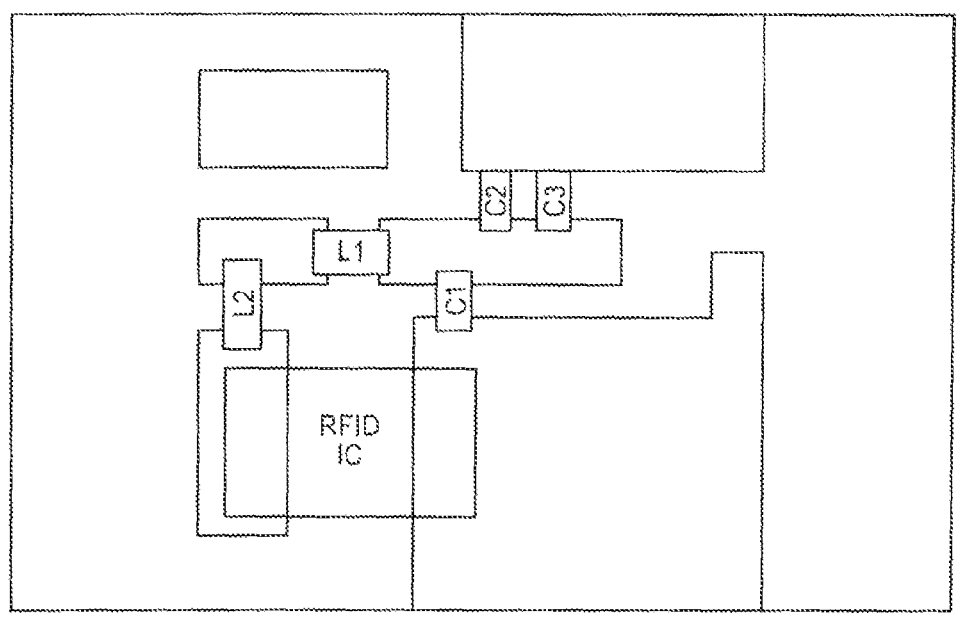
FIG. 26 is an electrical circuit diagram of the matching circuit shown in FIG. 25.

A 50-ohm slot antenna was designed for operation at 915 MHz using standard slot design equations. A single side metallized FR4 PC board measuring 6 inches (15.24 cm) by 12 inches (30.48 cm) was used as a substrate. The 8 inches (20.32 cm) by 0.4 inch (1.02 cm) slot antenna was created by mechanically etching the copper from the PC board surface. To flush mount and integrate the matching circuit, a hole was milled through the circuit board substrate in the center of the slot antenna and a small matching circuit board was inserted, as is shown in FIGS. 25*a* and 25*b*. The circuit board includes the components of the matching circuit. Reference numeral 450 indicates the RFID integrated circuit. While those of skill in the art will recognize that various circuit designs may be implemented including differing layouts and elements, the circuit design that was used in this example is shown in FIG. 26. As is shown in FIG. 26, the matching circuit that was used in this example includes multiple capacitors to provide a DC block. This will not be necessary in many applications, some of which can be completed, for example, with an inductor and a capacitor. The values of the individual components of the matching circuit are not shown, but those of skill in the art will recognize that these values will vary with different chip models and manufacturers. The formation of a separate matching circuit board permits the optimization of the matching circuit independent of the slot antenna. The matching circuit and slot antenna are then integrated in a separate step.

Those skilled in the art will realize that the matching network could be realized with stub tuning, which could be very thin if implemented using transmission line structures. The term "transmission line structures" is meant to include, but not be limited to, stripline, microstrip, and coplanar waveguides. Also, the matching network can be placed asymmetrically in the slot to provide the appropriate impedance matching characteristics.

B. Slot Antenna Directly Matched to the Chip

In this implementation of signages including a slot antenna, a slot design was formed that directly matches the chip impedance. One advantage of this design is that the matching network is eliminated, thus eliminating the complications that may arise as a result of integrating the matching network into the feed. However, one potential disadvantage of this design is that the antenna must be redesigned if a chip with a different impedance is implemented.

To match the slot directly to the chip, the aperture dimensions must be formulated to match the chip impedance. Consequently, the dimensions of the slot or aperture will vary based on the specific chip model implemented. The present inventors used modeling techniques to determine the optimal slot dimensions for a commercially available chip manufactured by Philips. The slot antenna was etched onto a single side of a metallized FR4 PC board measuring 6 inches (15.24 cm) by 12 inches (30.48 cm), as is described in Example 6. Formed in the center of the metal plate was a 3 inch (7.62 cm) long by 0.8 inch (2.03 cm) high aperture or slot. To ensure proper operation of the specific RFID integrated circuit used, DC blocking capacitors were used, as is described above. Those of skill in the art will appreciate that DC blocking capacitors may not be required in all implementations of this type of slot antenna. Read-range tests of a signage formed as described above were performed in an anechoic chamber. External electromagnetic interference was prevented or minimized by shielding the interior of the chamber with copper sheeting. Electromagnetic reflections within the chamber were prevented or minimized by absorption cones. The reader antenna was placed at one end of the chamber and the signage including an RFID tag that was being tested was placed at the other end of the chamber. The overall distance between the reader antenna and the slot antenna was approximately five feet. The power of the reader was set to 31 dBm. The cable loss was assumed to be 1 dB, therefore the resulting power output was 30 dBm. To determine the read-range, the reader power was attenuated in increments of 1 dB until the tag was no longer readable. For all measurements, the height of the slot tag was aligned with the reader antenna. The results were as shown in Table I below.

TABLE I

Results of Read-Range Testing for Matching Network and Directly Matched Slots.

| Design | Attenuation Setting | Calculated Read-Range |
|---|---|---|
| Matching Network | 9 dB | 14.2 ft. |
| Directly Matched Slots | 9 dB | 14.2 ft. |

Table I shows that the read-range results for the matching network and the directly matched slots were the same.

Figure 20:
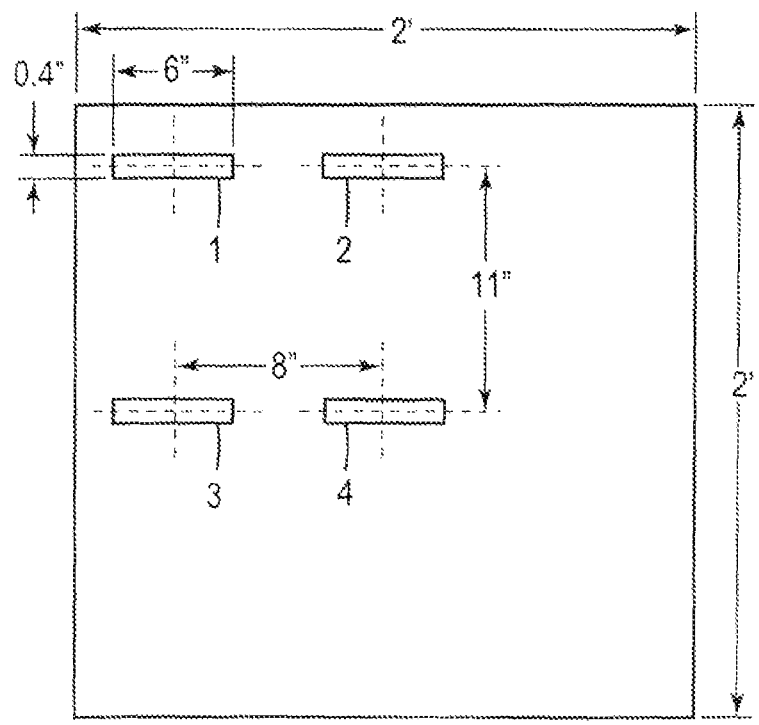
FIGS. 20 and 21 are schematic diagrams showing the locations of various slots that were modeled in a plate.

The present inventors also recognized that changing the shape, size, and location of the cutout, opening, slot, or aperture can result in changes in the direction of the radiation patterns and changes in the antenna impedance. When designing an RFID enabled sign, varying the size of the metallic road sign may not be an option. However, controlling the location of the slot antenna may be a more viable option. To further investigate the opportunity to control the slot antenna pattern, various locations of the slot within a plate of a fixed size was modeled. The positions of the slot locations that were evaluated are show in FIGS. 20 and 21. The antenna patterns cut were formed in the same plane as described in Example 7. The results of the modeling are shown in FIGS. 22 & 23. The results shown in FIG. 22 relate to the slot antenna locations shown in FIG. 20, and the results shown in FIG. 24 relate to the slot antenna locations shown in FIG. 21. FIG. 23 shows the modeling coordinate system (x, y, z, theta, and phi).

Figure 21:
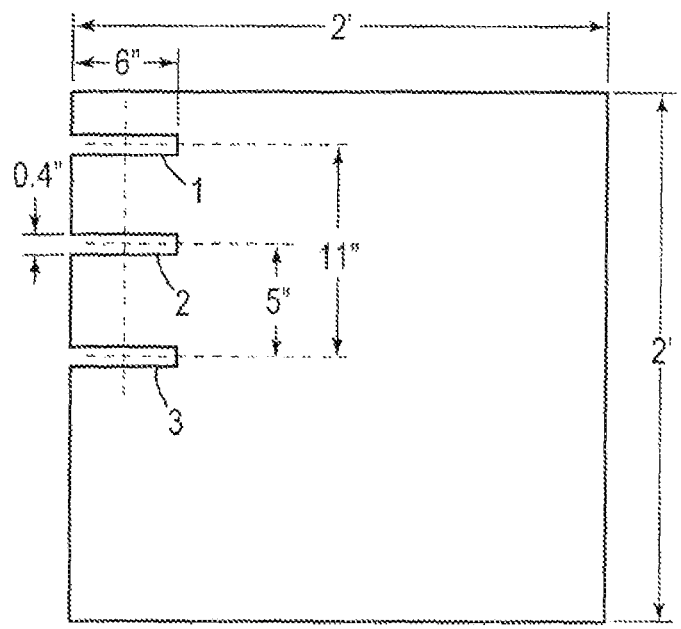
Figure 22:
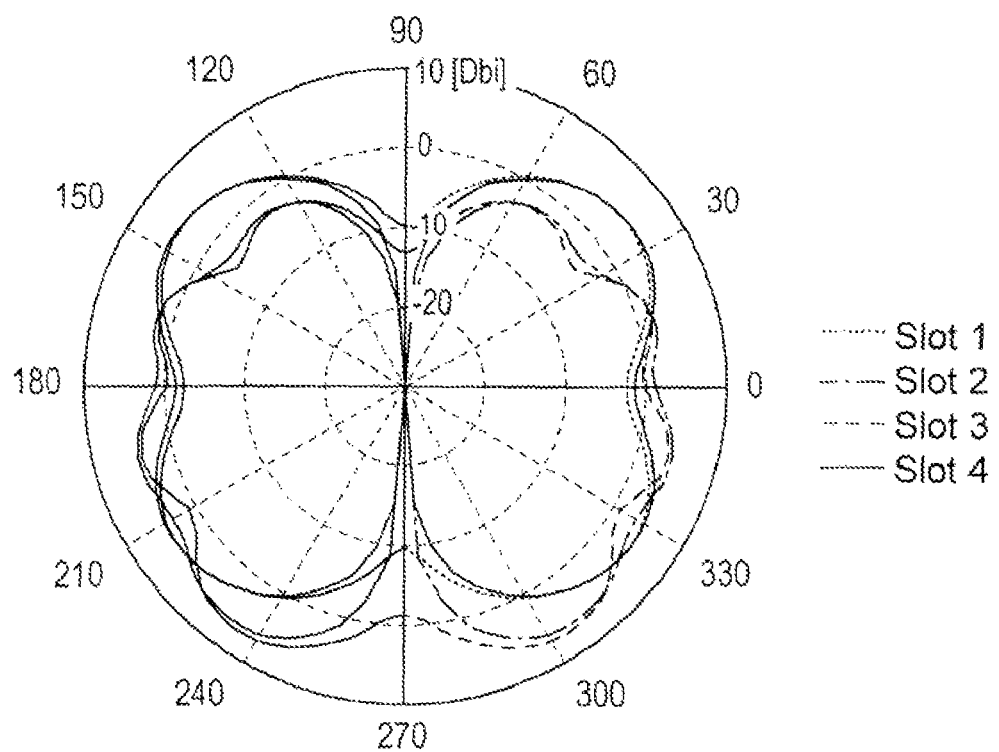
FIG. 22 shows the modeling results for the E-plane (y-z plane) that relate to the slot locations shown in FIG. 20.
Figure 23:
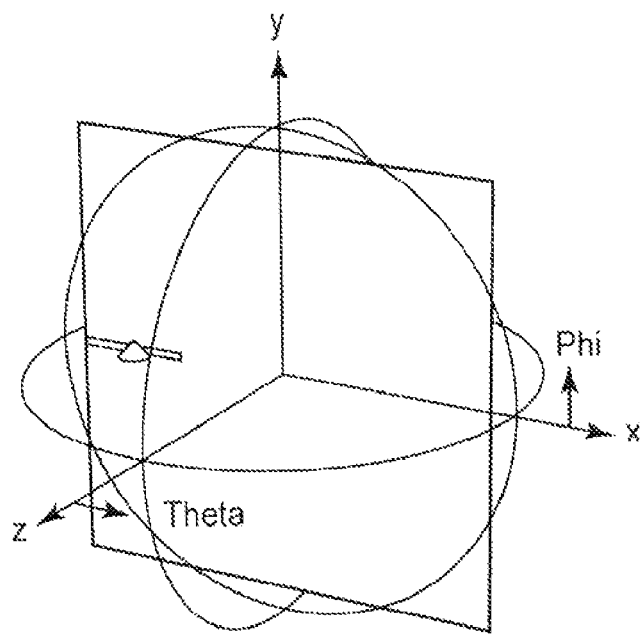
FIG. 23 shows the modeling coordinate system.
Figure 24:
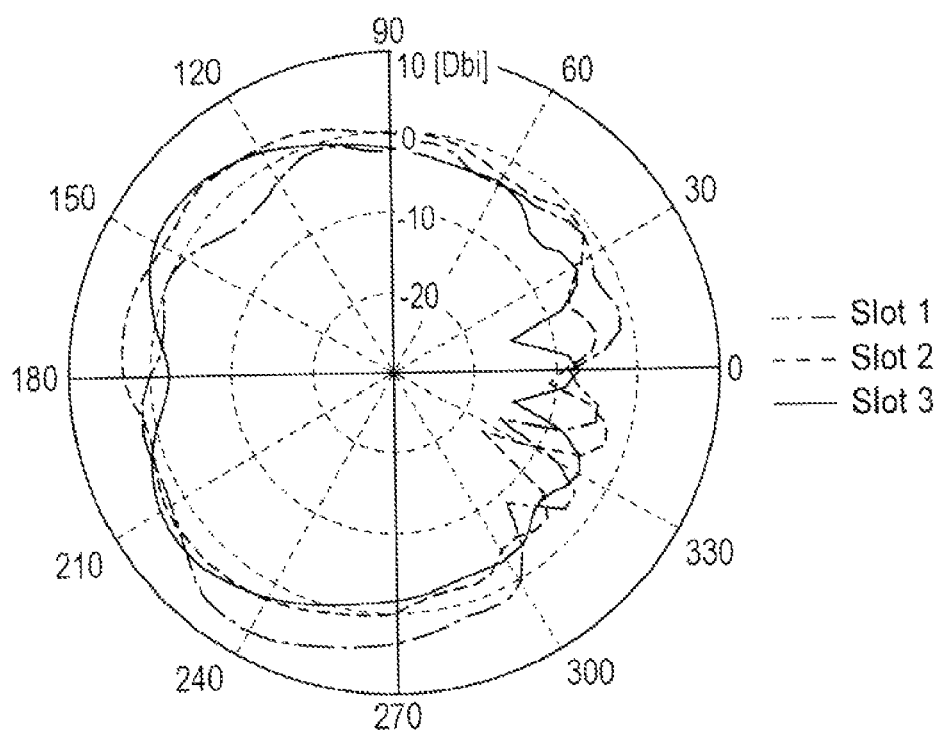
FIG. 24 shows the H-plane (x-y plane) modeling results that relate to the slot locations shown in FIG. 20.

FIGS. 20-24 allowed the present inventors to conclude that moving the broad edge of the slot toward the top edge of the plate (slots 1 and 2) directs the radiation pattern toward the bottom edge of the plate. In an effort to design an antenna pattern where radiation is directed primarily off the edge of the metal plate, the slot antenna may preferably be positioned so as to break through the periphery of the metal plate as is shown in FIG. 21. This positioning can produce a preferred direction of radiation off the edge of the metal sign.

All of the embodiments described above create a signage identification system including an electrically conductive signage and an RFID element. The signage may, for example, be used to create electronic signs to relay information to drivers electronically. Alternatively, the signage may be used to track signage during manufacture or to track signage that needs to be placed, replaced, repaired, or changed. Also, it will be appreciated that the above embodiments and implementations may include a surface acoustic wave (SAW) RFID tag rather than a traditional RFID tag.

The signage may include an optical surface where light incident on the optical surface is reflected or retroreflected from the signage back towards the light source. The radio frequency-responsive element preferably has information storage and transmission capability. The radio frequency-responsive element is preferably adapted to enable an interrogation system to obtain information from the element. The radiation pattern can be selected by design of the size of the signage and/or aperture, opening, slot, or cutout.

The RFID tags and/or chips described above may be attached or affixed to the electrically conductive signage when it is manufactured or may be applied at a point later in the signage's life.

Those having skill in the art will appreciate that many changes may be made to the details of the above-described embodiments without departing from the underlying principles thereof. The scope of the present application should, therefore, be determined only by the following claims.

The invention claimed is:

1. An electrically conductive, radio frequency identification (RFID)-enabled signage article, comprising:
   a slot antenna including an electrically conductive element having an opening; and
   an RFID integrated circuit coupled to the electrically conductive element, wherein the slot antenna operates as an RFID antenna;
   wherein the electrically conductive element includes at least one of an electrically conductive substrate or an electrically conductive sheeting.

2. The signage article of claim 1, wherein the electrically conductive element is a conductive substrate positioned adjacent to optically active sheeting.

3. The signage article of claim 1, wherein the electrically conductive element is a non-conductive substrate positioned adjacent to conductive optically active sheeting.

4. The signage article of claim 1, wherein the electrically conductive sheeting is retroreflective sheeting.

5. The signage article of claim 1, further comprising:
   a matching network electrically coupled in series between the RFID integrated circuit and the electrically conductive element that transforms the impedance between the RFID integrated circuit and the electrically conductive element.

6. The signage article of claim 5, wherein the matching network includes a transmission line structure.

7. The signage article of claim 1, including an electrically conductive substrate and an impedance of the antenna substantially matches an impedance of the RFID integrated circuit, and wherein the electrically conductive substrate is directly electrically coupled to the RFID integrated circuit.

8. The signage article of claim 1, further comprising a strap positioned to span at least a portion of the opening of the slot antenna and to electrically couple the RFID integrated circuit to the electrically conductive element.

9. The signage article of claim 8, wherein the RFID integrated circuit is attached to the strap.

10. The signage article of claim 8, wherein the strap and the RFID integrated circuit are substantially flush with a major surface of the electrically conductive element.

11. The signage article of claim 8, wherein the strap is positioned between a first major surface and a second major surface of the electrically conductive element such that the strap is within a thickness of the electrically conductive element.

12. The signage article of claim 8, wherein the strap has a thickness of at least 0.5 mil (0.0005 inch).

13. The signage article of claim 8, wherein the strap is in direct electrical contact with at least a portion of the electrically conductive element.

14. The signage article of claim 8, wherein the strap is capacitively coupled to at least a portion of the electrically conductive element.

15. The signage article of claim 1, wherein the opening forms a rectangular slot.

16. The signage article of claim 15, wherein the rectangular slot has a length and a width and the length of the rectangular slot is at least ten times greater than the width of the rectangular slot.

17. The signage article of claim 1, wherein the signage article comprises at least one of a traffic control material; a vehicle marking; a roadway marking; a retroreflective garment; an indoor/outdoor labeling product; a frangible security sticker; a product authentication material; a store display package; a document; an inventory labeling and control product; an identification tag; an identification label; an identification system; a license plate; or a road sign.

18. The signage article of claim 1, wherein the opening forms an annular ring.

19. The signage article of claim 1, wherein the opening is one slot in an array of slots.

20. The signage article of claim 1, wherein the RFID integrated circuit is an RFID integrated circuit utilized in a surface acoustic wave (SAW) RFID tag.

21. The signage article of claim 1, wherein the RFID integrated circuit stores information related to the signage article.

22. The signage article of claim 21, wherein the RFID integrated circuit stores the inspection history of the signage article.

23. A method of forming an electrically conductive, RFID-enabled signage article, comprising:
   selecting an electrically conductive element having a length and a width;
   forming an opening in at least a portion of the electrically conductive element; and
   coupling a radio frequency identification (RFID) integrated circuit to the electrically conductive element;
   wherein the selecting a substrate having a length and a width is based on a desired radiation direction/pattern of the electrically conductive, RFID-enabled signage article that is formed when the RFID integrated circuit is coupled with the electrically conductive element.

24. The method of claim 23, wherein the electrically conductive element is a conductive substrate positioned adjacent to optically active sheeting.

25. The method of claim 23, wherein the electrically conductive element is a non-conductive substrate positioned adjacent to conductive optically active sheeting.

26. The method of claim 23, wherein the coupling a radio frequency identification (RFID) integrated circuit to the electrically conductive element involves attaching the RFID integrated circuit to a strap and coupling the strap to the electrically conductive element.

27. The method of claim 23, further comprising:
   selecting a matching network to transform the impedance between the RFID integrated circuit and the electrically conductive element; and
   placing the matching network between the RFID integrated circuit and the electrically conductive element.

28. The method of claim 23, wherein the RFID integrated circuit is positioned asymmetrically off-center within the opening in the signage article to effect a desired direction of radiation.

29. The method of claim 23, wherein the RFID integrated circuit is positioned symmetrically and centered within the opening in the signage article to effect a desired direction of radiation.

30. A method, comprising:
    selecting a location on an electrically conductive element;
    forming an opening in at least a portion of the electrically conductive element at the selected location; and
    coupling a radio frequency identification (RFID) integrated circuit to at least a portion of the electrically conductive element;
    wherein the selecting a location on the electrically conductive element is based on a desired radiation direction/pattern of a electrically conductive, RFID-enabled signage article that is formed when the RFID integrated circuit is coupled with the electrically conductive element.

* * * * *